(12) United States Patent
Seguchi

(10) Patent No.: US 11,196,308 B2
(45) Date of Patent: Dec. 7, 2021

(54) FIELD COIL TYPE ROTATING ELECTRIC MACHINE

(71) Applicant: DENSO CORPORATION, Kariya (JP)

(72) Inventor: Masahiro Seguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 115 days.

(21) Appl. No.: 16/778,068

(22) Filed: Jan. 31, 2020

(65) Prior Publication Data

US 2020/0251940 A1    Aug. 6, 2020

(30) Foreign Application Priority Data

Jan. 31, 2019 (JP) .............................. JP2019-016497

(51) Int. Cl.
 *H02K 3/38* (2006.01)
 *H02K 1/24* (2006.01)
 *H02K 19/12* (2006.01)
 *H02K 3/28* (2006.01)

(52) U.S. Cl.
 CPC ............... *H02K 1/243* (2013.01); *H02K 3/28* (2013.01); *H02K 19/12* (2013.01)

(58) Field of Classification Search
 CPC .. H02K 1/00; H02K 1/16; H02K 1/24; H02K 1/243; H02K 1/26; H02K 3/00; H02K 3/12; H02K 3/28; H02K 3/48; H02K 9/00; H02K 9/22; H02K 11/00; H02K 11/02; H02K 11/028; H02K 11/04; H02K 11/042; H02K 19/00; H02K 19/12; H02K 19/26; H02K 19/28; H02K 19/36; H02K 23/00; H02K 23/66

USPC ............ 310/68 R, 179–180, 184, 190, 261.1
See application file for complete search history.

(56) References Cited

U.S. PATENT DOCUMENTS

| | | | | |
|---|---|---|---|---|
| 7,358,698 B2* | 4/2008 | Seguchi | ................ | H02K 19/28 318/700 |
| 8,847,455 B2* | 9/2014 | Hiramoto | ............... | H02K 19/12 310/180 |
| 2012/0256510 A1* | 10/2012 | Yamada | ................ | H02K 19/12 310/184 |
| 2014/0285057 A1* | 9/2014 | Aoyama | ................ | H02K 3/28 310/210 |
| 2019/0207491 A1 | 7/2019 | Seguchi | | |

* cited by examiner

*Primary Examiner* — Tran N Nguyen
(74) *Attorney, Agent, or Firm* — Oliff PLC

(57) ABSTRACT

A field coil type rotating electric machine includes a field coil having a serially-connected coil section pair consisting of first and second coil sections, a diode having its cathode and anode respectively connected to opposite ends of the serially-connected coil section pair, a rotating shaft, and a rotor having main pole portions radially protruding from a rotor core. In the rotating electric machine, there are formed both a series resonance circuit including the first coil section and at least one capacitor and a parallel resonance circuit including the second coil section and the at least one capacitor. Electronic components electrically connected with the field coil, which include the diode and the at least one capacitor, are arranged so that an overall center of gravity of all the electronic components is located closer than each of centers of gravity of the electronic components to a central axis of the rotating shaft.

11 Claims, 14 Drawing Sheets

FIG. 6(a) FUNDAMENTAL CURRENT 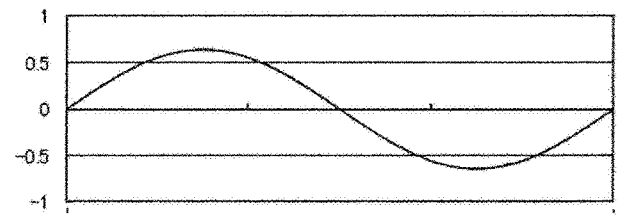
FIG. 6(b) HARMONIC CURRENT 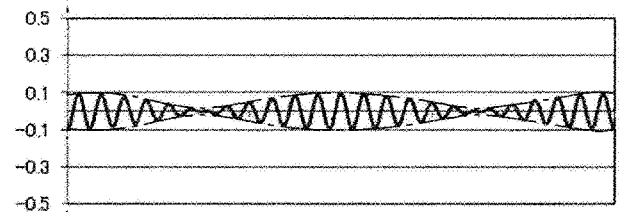
FIG. 6(c) RESULTANT CURRENT 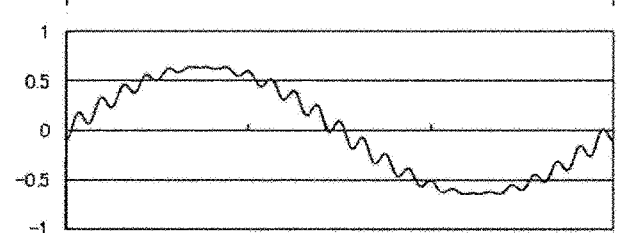
FIG.7
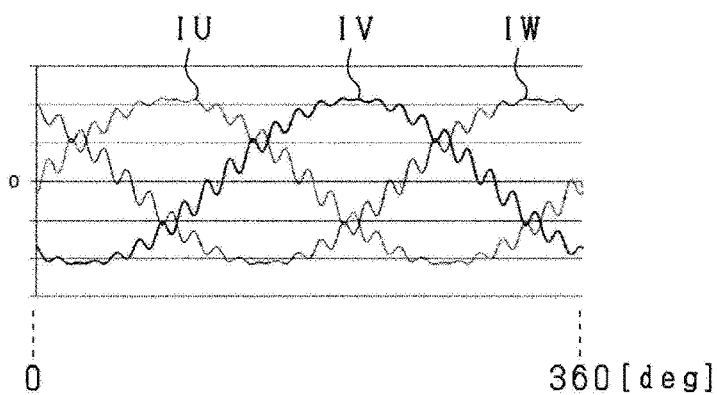

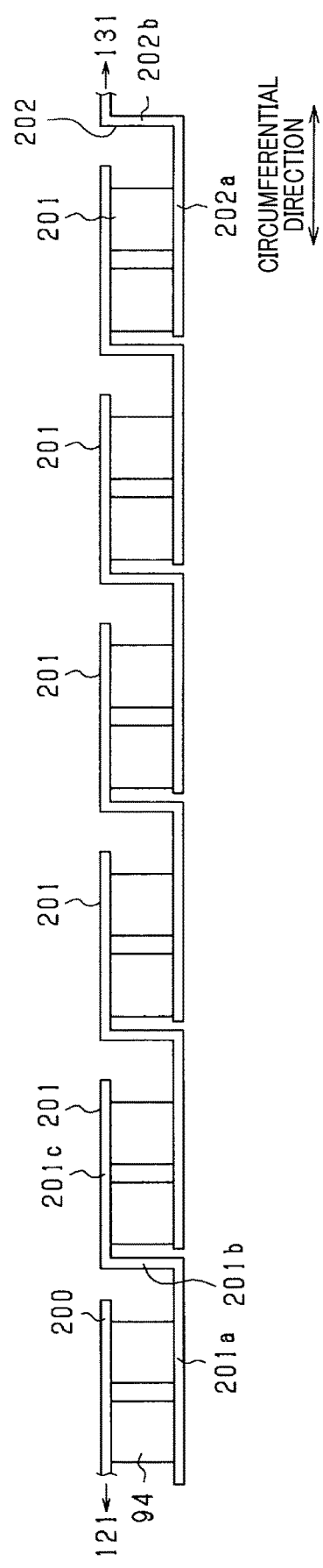

FIELD COIL TYPE ROTATING ELECTRIC MACHINE

CROSS-REFERENCE TO RELATED APPLICATION

This application is based on and claims priority from Japanese Patent Application No. 2019-16497 filed on Jan. 31, 2019, the contents of which are hereby incorporated by reference in their entirety into this application.

BACKGROUND

1 Technical Field

The present disclosure relates to field coil type rotating electric machines.

2 Description of Related Art

There is known a field coil type rotating electric machine which includes a stator, a filed coil, a rotor and a diode. The stator includes a stator coil. The field coil is constituted of a serially-connected coil section pair consisting of first and second coil sections. The rotor includes a rotor core and a plurality of main pole portions. The main pole portions are spaced at predetermined intervals in a circumferential direction and each radially protrude from the rotor core. The diode has its cathode connected to a first coil section-side end of the serially-connected coil section pair and its anode connected to a second coil section-side end of the serially-connected coil section pair. Each of the first and second coil sections is wound on each of the main pole portions of the rotor.

In operation, both fundamental current mainly for generating torque and harmonic current mainly for exciting the field coil are supplied to the stator coil. Upon supply of the harmonic current to the stator coil, main magnetic flux flows through a magnetic circuit which includes the main pole portions circumferentially adjacent to one another and the rotor core. Consequently, voltages are induced respectively in the first and second coil sections that are serially connected with each other, thereby inducing electric currents respectively in the first and second coil sections. Moreover, the electric currents induced in the first and second coil sections are rectified by the diode to flow in one direction, namely the rectification direction. As a result, field current flows in the field coil in the rectification direction, thereby exciting the field coil.

However, upon supply of the harmonic current to the stator coil, leakage magnetic flux is also generated in addition to the main magnetic flux. The leakage magnetic flux flows between each circumferentially-adjacent pair of the main pole portions without flowing through the rotor core, crossing the field coil. Consequently, the leakage magnetic flux also induces voltages respectively in the first and second coil sections; the voltages induced by the leakage magnetic flux are opposite in polarity to the voltages induced by the main magnetic flux, thus reducing the electric currents induced in the first and second coil sections. As a result, the sum of the electric currents respectively induced in the first and second coil sections is reduced, and thus the field current flowing in the field coil is reduced.

To solve the above problem, the field coil type rotating electric machine further includes a capacitor that is connected in parallel with the second coil section. Consequently, both a series resonance circuit including the first coil section and the capacitor and a parallel resonance circuit including the second coil section and the capacitor are formed, thereby increasing the field current.

SUMMARY

According to the present disclosure, there is provided a field coil type rotating electric machine which includes a stator, a field coil, a rotating shaft and a rotor. The stator includes a stator coil. The field coil includes a serially-connected coil section pair consisting of first and second coil sections. The rotating shaft has a central axis. The rotor is fixed on the rotating shaft to rotate together with the rotating shaft. The rotor includes a rotor core and a plurality of main pole portions spaced at predetermined intervals in a circumferential direction and each radially protruding from the rotor core. Each of the first and second coil sections is wound on each of the main pole portions of the rotor. The field coil type rotating electric machine is configured to have field current induced in the field coil upon supply of harmonic current to the stator coil. The field coil type rotating electric machine further includes a diode and at least one capacitor. The diode has its cathode connected to a first coil section-side end of the serially-connected coil section pair and its anode connected to a second coil section-side end of the serially-connected coil section pair. The at least one capacitor is connected in parallel with the second coil section. In the field coil type rotating electric machine, there are formed both a series resonance circuit including the first coil section and the at least one capacitor and a parallel resonance circuit including the second coil section and the at least one capacitor. Electronic components electrically connected with the field coil, which include the diode and the at least one capacitor, are arranged so that an overall center of gravity of all the electronic components is located closer than each of centers of gravity of the electronic components to the central axis of the rotating shaft.

BRIEF DESCRIPTION OF THE DRAWINGS

FIGS. 6(a)-6(c) are waveform charts illustrating the waveforms of fundamental current, harmonic current and resultant current supplied to each phase winding of a stator coil of the stator;

FIG. 7 is a waveform chart illustrating the waveform of a three-phase alternating current supplied to the stator coil;

FIG. 19 is a developed view, in a circumferential direction, of the busbars and capacitors of the field coil type rotating electric machine according to the second embodiment.

DESCRIPTION OF EMBODIMENTS

Figure 1:
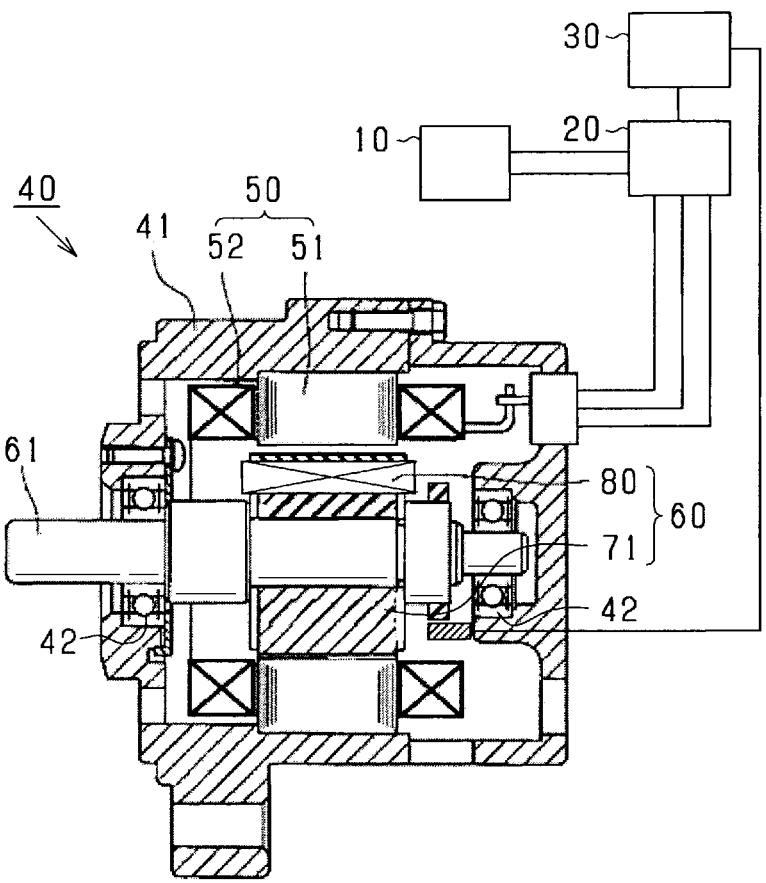
FIG. 1 is an overall configuration diagram of a rotating electric machine system which includes a field coil type rotating electric machine according to a first embodiment.

In the above-described field coil type rotating electric machine known in the art (see, for example, Japanese Patent Application Publication No. JP2018042401A), electronic components electrically connected with the field coil, which include the diode and the components of the series and parallel resonance circuits, are arranged on the rotor. Depending on the manner of arrangement of the electronic components, vibration and noise generated with rotation of the rotor may be increased, thereby degrading the NV (Noise and Vibration) characteristics of the field coil type rotating electric machine.

In contrast, in the above-described field coil type rotating electric machine according to the present disclosure, the electronic components electrically connected with the field coil, which include the diode and the at least one capacitor, are arranged so that the overall center of gravity of all the electronic components is located closer than each of the centers of gravity of the electronic components to the central axis of the rotating shaft. With the above arrangement, it becomes possible to reduce vibration and noise generated with rotation of the rotor, thereby improving the NV characteristics of the field coil type rotating electric machine.

Exemplary embodiments will be described hereinafter with reference to the drawings. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

FIG. 1 shows the overall configuration of a rotating electric machine system which includes a field coil type rotating electric machine 40 according to the first embodiment.

As shown in FIG. 1, the rotating electric machine system includes a DC power supply 10, an inverter 20, a controller 30 and the rotating electric machine 40.

The rotating electric machine 40 is a field coil type synchronous rotating electric machine. More particularly, in the present embodiment, the controller 30 controls the rotating electric machine 40 to function as an ISG (Integrated Starter Generator) or an MG (Motor Generator). In addition, the rotating electric machine 40, the inverter 20 and the controller 30 may be either integrated into a single drive apparatus or be configured as individual components.

Referring to FIG. 1, the rotating electric machine 40 includes a housing 41, and a stator 50 and a rotor 60 both of which are received in the housing 41. In the present embodiment, the rotating electric machine 40 is of an inner rotor type such that the rotor 60 is arranged radially inside the stator 50.

The stator 50 includes a stator core 51 and a three-phase stator coil 52 wound on the stator core 51. The stator coil 52 is formed of, for example, copper wires. The stator coil 52 includes a U-phase winding 52U, a V-phase winding 52V and a W-phase winding 52W, which are arranged to be offset from each other by 120° in electrical angle.

The rotor 60 includes a rotor core 71 and a field coil 80. The field coil 80 is formed by, for example, compression shaping to improve the space factor and the assemblability thereof. Moreover, the field coil 80 is formed of, for example, aluminum wires. The specific gravity of aluminum wires is relatively low. Therefore, forming the field coil 80 with aluminum wires, it is possible to lower the centrifugal force during rotation of the rotor 60. Moreover, aluminum wires are lower in both strength and hardness than copper wires. Therefore, aluminum wires are suitable for being compression-shaped. It should be noted that the field coil 80 may alternatively be formed of copper wires. The configuration of the field coil 80 will be described in detail later.

In a center hole of the rotor core 71, there is inserted a rotating shaft 61 so that the rotor 60 rotates together with the rotating shaft 61. The rotating shaft 61 is rotatably supported by the housing 41 via bearings 42.

Figure 2:
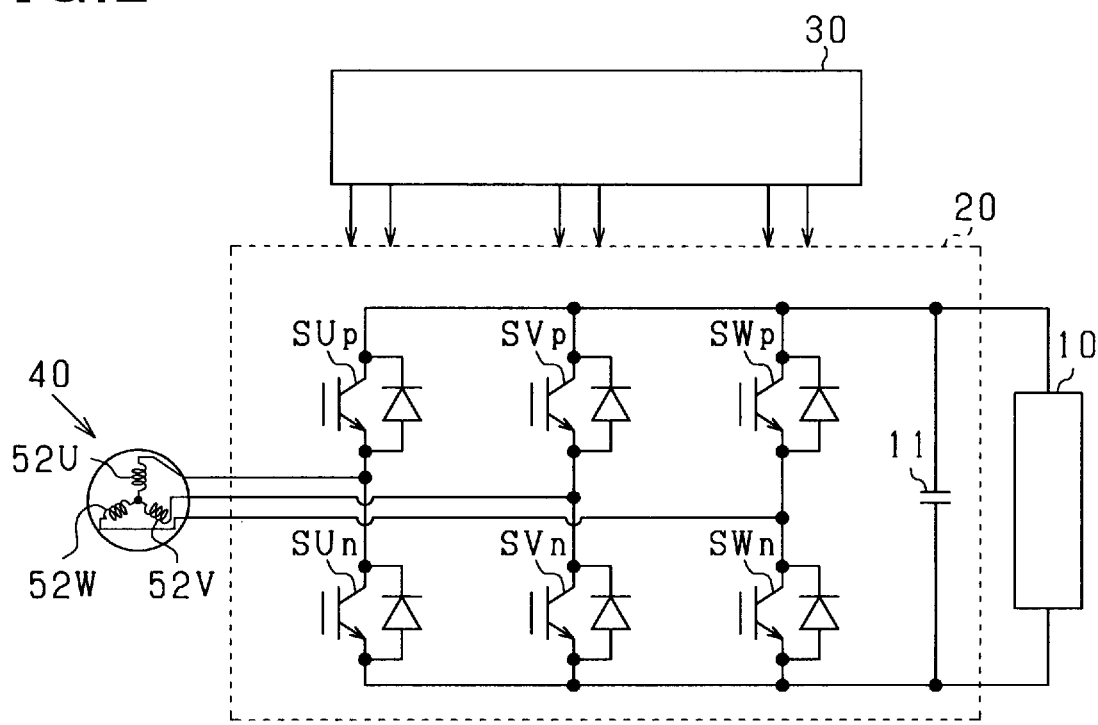
FIG. 2 is a schematic circuit diagram of both the field coil type rotating electric machine and an inverter included in the system.

As shown in FIG. 2, the inverter 20 includes a serially-connected U-phase switch pair consisting of a U-phase upper-arm switch SUp and a U-phase lower-arm switch SUn, a serially-connected V-phase switch pair consisting of a V-phase upper-arm switch SVp and a V-phase lower-arm switch SVn, and a serially-connected W-phase switch pair consisting of a W-phase upper-arm switch SWp and a W-phase lower-arm switch SWn.

To a junction point between the U-phase upper-arm and lower-arm switches SUp and SUn, there is connected a first end of the U-phase winding 52U of the stator coil 52. To a junction point between the V-phase upper-arm and lower-arm switches SVp and SVn, there is connected a first end of the V-phase winding 52V of the stator coil 52. To a junction point between the W-phase upper-arm and lower-arm switches SWp and SWn, there is connected a first end of the W-phase winding 52W of the stator coil 52. A second end of the U-phase winding 52U, a second end of the V-phase winding 52V and a second end of the W-phase winding 52W are connected together to defined a neutral point therebetween. That is, in the present embodiment, the U-phase, V-phase and W-phase windings 52U, 52V and 52W of the stator coil 52 are star-connected.

In addition, in the present embodiment, each of the switches SUp, SVp, SWp, SUn, SVn and SWn is implemented by an IGBT (Insulated-Gate Bipolar Transistor). Moreover, each of the switches SUp, SVp, SWp, SUn, SVn and SWn has a freewheeling diode connected in antiparallel thereto.

Each of the U-phase, V-phase and W-phase upper-arm switches SUp, SVp and SWp has its collector connected to a positive terminal of the DC power supply 10. Each of the U-phase, V-phase and W-phase lower-arm switches SUn, SVn and SWn has its emitter connected to a negative terminal of the DC power supply 10. In addition, a smoothing capacitor 11 is connected in parallel with the DC power supply 10.

Figure 3:
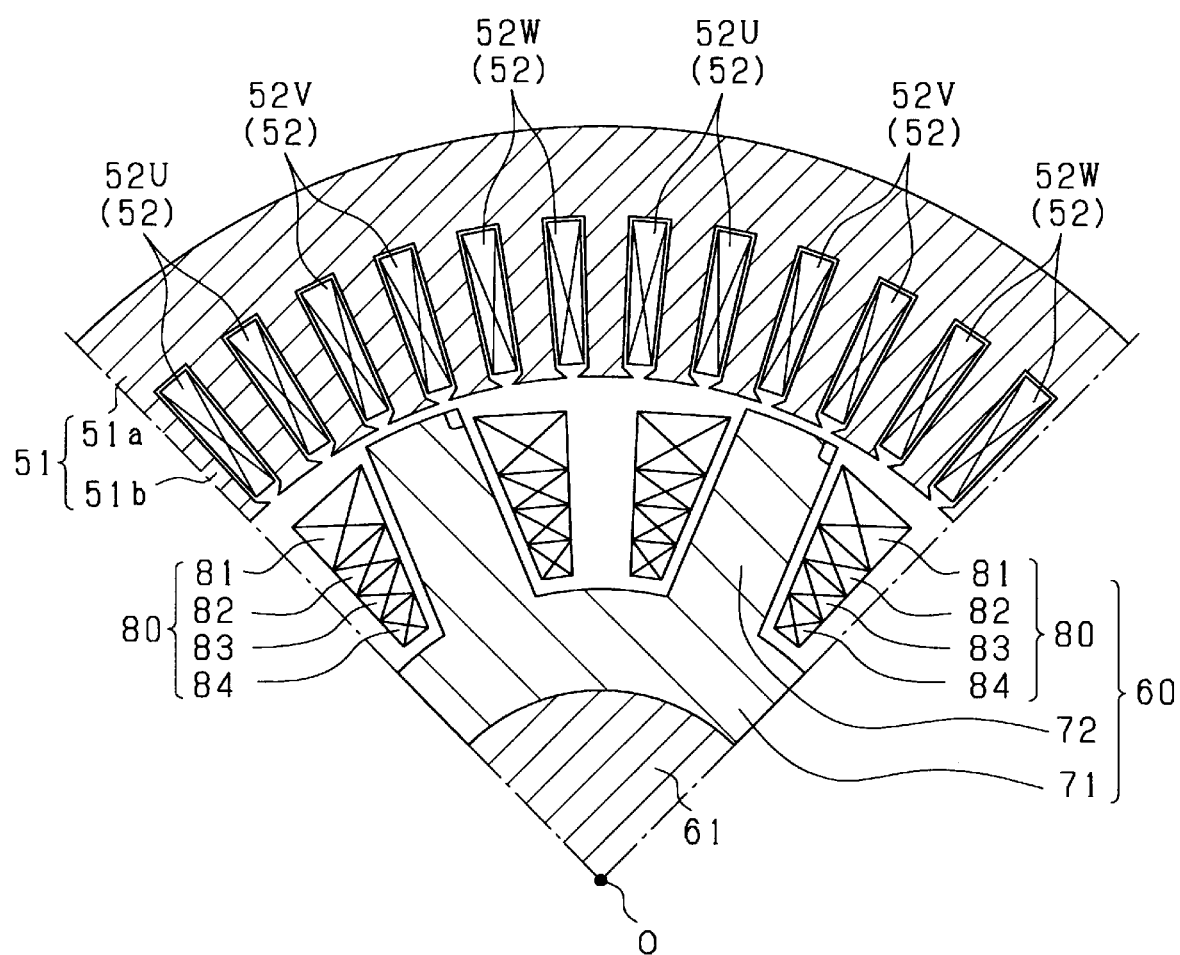
FIG. 3 is a transverse cross-sectional view of both a rotor and a stator of the field coil type rotating electric machine.

Referring now to FIG. 3, in the rotating electric machine 40, both the stator 50 and the rotor 60 are arranged coaxially with the rotating shaft 61. Hereinafter, the direction in which the central axis O of the rotating shaft 61 extends will be referred to as the axial direction; the directions of extending radially from the central axis O will be referred to as radial directions; and the direction of extending along a circle whose center is on the central axis O will be referred to as the circumferential direction.

The stator core 51 is formed by laminating a plurality of soft-magnetic steel sheets in the axial direction. The stator core 51 has an annular yoke portion 51a and a plurality of teeth 51b which each protrude radially inward from the yoke portion 51a and are spaced at equal intervals in the circumferential direction. Between each circumferentially-adjacent pair of the teeth 51b, there is formed one slot. More particularly, in the present embodiment, the number of teeth 51b of the stator core 51 is set to 48; accordingly, the number of the slots formed in the stator core 51 is also equal to 48. In addition, each of the U-phase, V-phase and W-phase windings 52U, 52V and 52W of the stator coil 52 is wound on the teeth 51b of the stator core 51 in a distributed winding manner or a concentrated winding manner.

Figure 4:
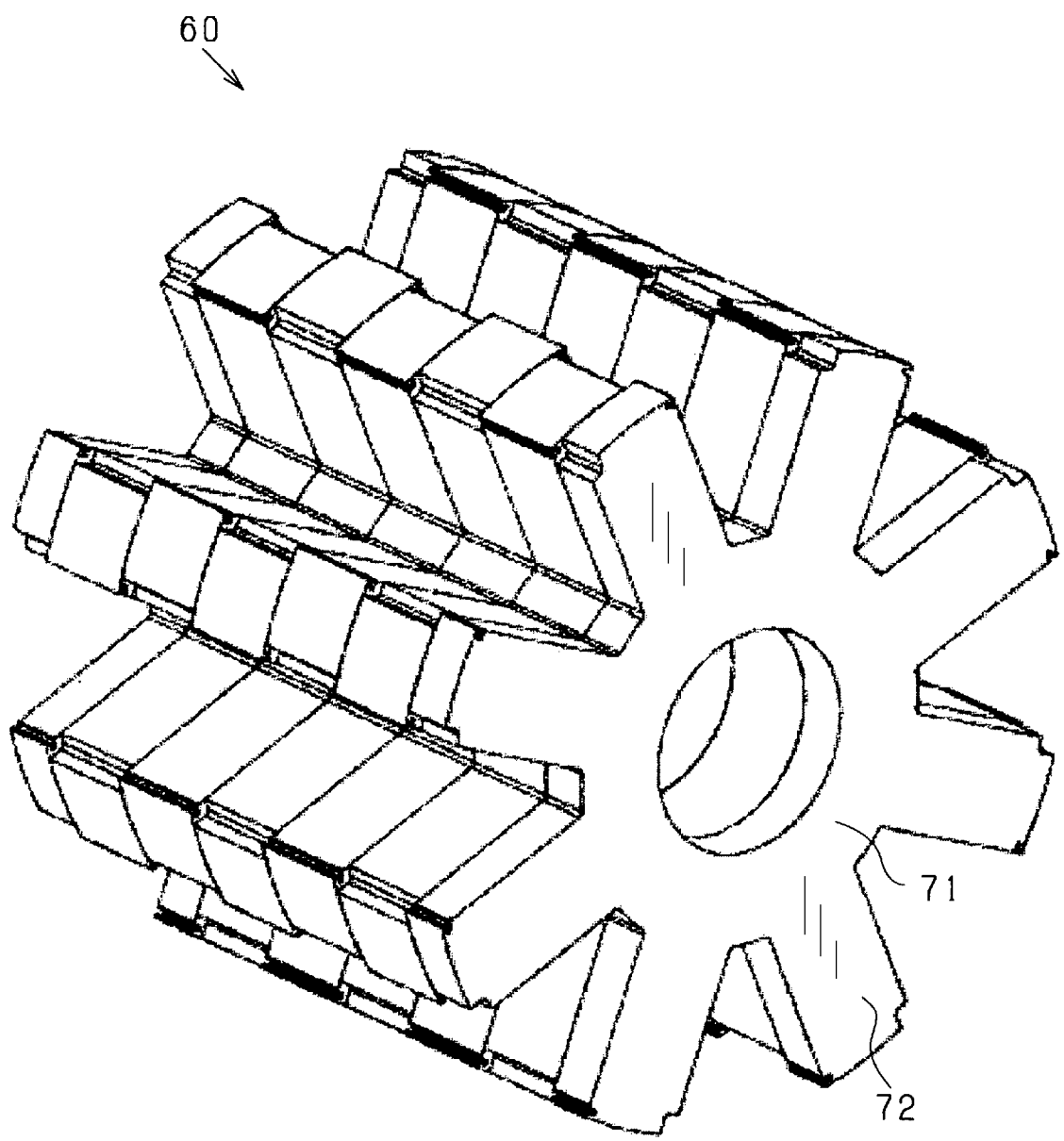
FIG. 4 is a perspective view of the rotor.

The rotor 60 is also formed by laminating a plurality of soft-magnetic steel sheets in the axial direction. As shown in FIGS. 3 and 4, the rotor 60 includes a cylindrical rotor core 71 and a plurality of main pole portions 72 which each protrude radially outward from the rotor core 71 and are spaced at equal intervals in the circumferential direction. Distal end surfaces (or radially outer end surfaces) of the main pole portions 72 radially face distal end surfaces (or radially inner end surfaces) of the teeth 51b of the stator core 51. More particularly, in the present embodiment, the number of the main pole portions 72 is set to 8.

The field coil 80 is comprised of first windings 81, second windings 82, third windings 83 and fourth windings 84. On each of the main pole portions 72 of the rotor 60, there is concentratedly wound one of the first windings 81, one of the second windings 82, one of the third windings 83 and one of the fourth windings 84 in this order from the radially outer side. Moreover, on each of the main pole portions 72, all of the first, second, third and fourth windings 81, 82, 83 and 84 are wound in the same direction. Furthermore, for each circumferentially-adjacent pair of the main pole portions 72, the winding direction of the windings 81-84 on one of the main pole portions 72 of the circumferentially-adjacent pair is opposite to the winding direction of the windings 81-84 on the other of the main pole portions 72 of the circumferentially-adjacent pair. Consequently, the magnetization directions of the main pole portions 72 of the circumferentially-adjacent pair are opposite to each other. In addition, it should be noted that for the sake of simplicity, in FIG. 3, winding holders 140 are omitted which will be described later and on which the windings 81-84 are wound.

Figure 5:
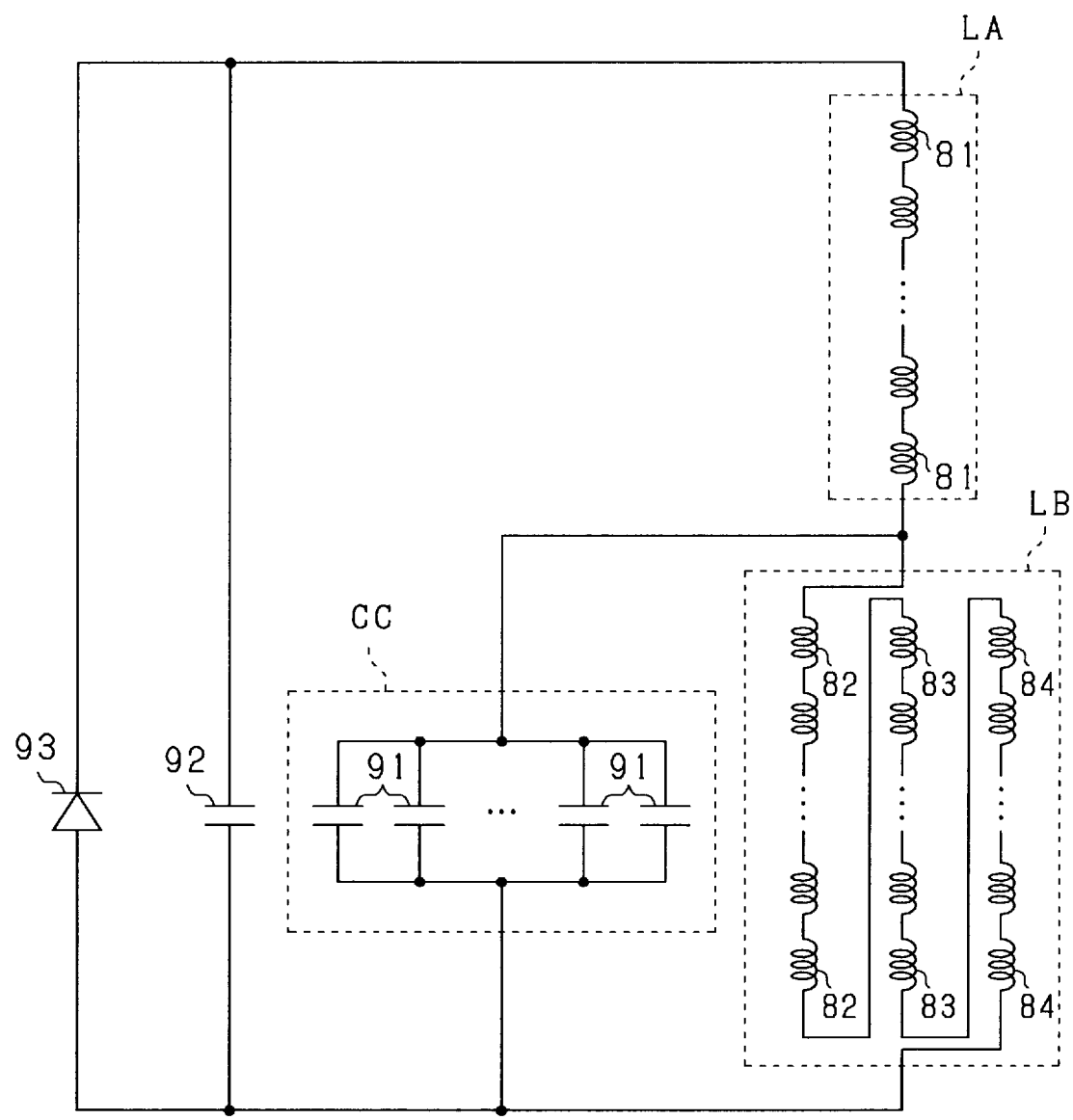
FIG. 5 is a configuration diagram of resonance circuits formed in the field coil type rotating electric machine.
Figure 8:
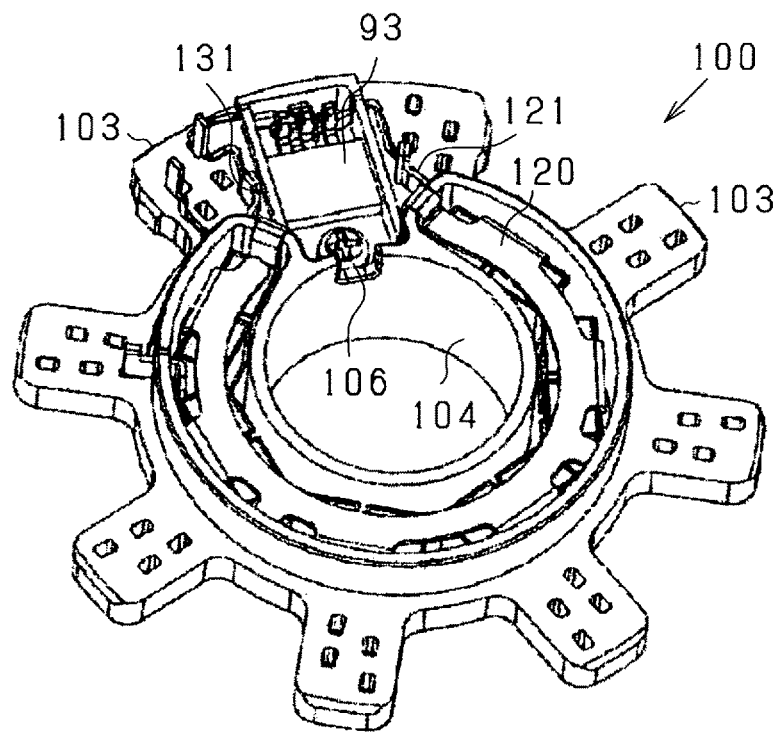
FIG. 8 is a perspective view of a circuit module of the field coil type rotating electric machine.

FIG. 5 shows the electrical configuration of resonance and rectification circuits provided on the rotating shaft 61.

The resonance and rectification circuits are composed mainly of a first coil section LA, a second coil section LB, a capacitor unit CC constituted of a plurality of first capacitors 91, a second capacitor 92 and a diode 93. The first coil section LA is formed by serially connecting the eight first windings 81 wound respectively on the eight main pole portions 72 of the rotor 60. The second coil section LB is formed by serially connecting the eight second windings 82 that are wound respectively on the eight main pole portions 72 and serially connected with each other, the eight third windings 83 that are wound respectively on the eight main pole portions 72 and serially connected with each other, and the eight fourth windings 84 that are wound respectively on the eight main pole portions 72 and serially connected with each other. In addition, the numbers of turns of the windings 81-84 are set to gradually decrease from the radially outer side to the radially inner side; and the numbers of turns of at least the second and third windings 82 and 83 are set to be greater than or equal to ½ of the number of turns of the first windings 81. Consequently, the resultant inductance of the second coil section LB is higher than the resultant inductance of the first coil section LA.

More particularly, in the present embodiment, the capacitor unit CC is constituted of eleven first capacitors 91 that are connected in parallel with each other. On the other hand, there is provided only one second capacitor 92 on the rotating shaft 61. Moreover, all of the first capacitors 91 and the second capacitor 92 have the same configuration and thus have the same shape and weight.

The second capacitor 92, which is provided for noise suppression, is connected in parallel with a serially-connected coil section pair consisting of the first coil section LA and the second coil section LB.

In addition, in the present embodiment, the capacitor unit CC is configured with the plurality of first capacitors 91 connected in parallel with each other, so as to reduce electric current flowing to each first capacitor 91. Consequently, it becomes possible to lower the upper limit of electric current allowed to be supplied to each first capacitor 91 and the capacitance of each first capacitor 91, thereby reducing the size of each first capacitor 91. As a result, it becomes easier to receive in a desired space each of the first capacitors 91 and the second capacitor 92 having the same configuration as the first capacitors 91.

A first end of the first coil section LA is connected to the cathode of the diode 93. A second end of the first coil section LA is connected to a first end of the second coil section LB. A second end of the second coil section LB is connected to the anode of the diode 93. The capacitor unit CC is connected in parallel with the second coil section LB.

Referring back to FIG. 2, in the rotating electric machine system, the controller 30 is provided to generate drive signals for turning on/off the switches SUp, SVp, SWp, SUn, SVn and SWn of the inverter 20. Specifically, when driving the rotating electric machine 40 to function as an electric motor, to convert DC power outputted from the DC power supply 10 into AC power and supply the resultant AC power to the U-phase, V-phase and W-phase windings 52U, 52V and 52W, the controller 30 generates drive signals for turning on/off the switches SUp, SVp, SWp, SUn, SVn and SWn and outputs the generated drive signals to the gates of the switches SUp, SVp, SWp, SUn, SVn and SWn. Moreover, when driving the rotating electric machine 40 to function as an electric generator, to convert AC power outputted from the U-phase, V-phase and W-phase windings 52U, 52V and 52W into DC power and supply the resultant DC power to the DC power supply 10, the controller 30 generates drive signals for turning on/off the switches SUp, SVp, SWp, SUn, SVn and SWn and outputs the generated drive signals to the gates of the switches SUp, SVp, SWp, SUn, SVn and SWn.

In addition, both the inverter 20 and the controller 30 may be either built in the housing 41 or provided outside the housing 41. Moreover, part or the whole of each function of the controller 30 may be realized either by hardware such as one or more integrated circuits or by software recorded on a non-transitory tangible recording medium and a computer executing the software.

When driving the rotating electric machine 40 to function as an electric motor, the controller 30 turns on/off the switches SUp, SVp, SWp, SUn, SVn and SWn of the inverter 20 to supply each of the U-phase, V-phase and W-phase windings 52U, 52V and 52W with resultant current which is the resultant of fundamental current and harmonic current. As shown in FIG. 6(a), the fundamental current is electric current mainly for causing the rotating electric machine 40 to generate torque. As shown in FIG. 6(b), the harmonic current is electric current mainly for exciting the field coil 80. As shown in FIG. 6(c), the resultant current is the resultant of the fundamental current and the harmonic current and supplied as phase current to each of the U-phase, V-phase and W-phase windings 52U, 52V and 52W. In addition, the vertical axis in FIGS. 6(a)-6(c) indicates the relationship in magnitude between the fundamental current, the harmonic current and the resultant current.

As shown in FIG. 7, U-phase, V-phase and W-phase currents IU, IV and IW, which are supplied respectively to the U-phase, V-phase and W-phase windings 52U, 52V and 52W, are offset in phase from each other by 120° in electrical angle.

In the present embodiment, as shown in FIGS. 6(a) and (b), the period of the envelope of the harmonic current is set to be ½ of the period of the fundamental current. The envelope of the harmonic current is designated by a one-dot chain line in FIG. 6(b). Moreover, the timings at which the envelope of the harmonic current reaches its peak values are offset from the timings at which the fundamental current reaches its peak values. More specifically, the timings at which the envelope of the harmonic current reaches its peak values coincide with the timings at which the fundamental current reaches its center of variation (i.e., 0). The controller 30 controls the amplitude and period of each of the fundamental current and the harmonic current severally.

In the present embodiment, on the rotating shaft 61, there are formed both a series resonance circuit that includes the first coil section LA and the capacitor unit CC and a parallel resonance circuit that includes the second coil section LB and the capacitor unit CC. Upon the harmonic current flowing in each of the U-phase, V-phase and W-phase windings 52U, 52V and 52W, main magnetic flux changes due to harmonics; the main magnetic flux flows through a magnetic circuit that includes the main pole portions 72 circumferentially adjacent to one another, the rotor core 71, the teeth 51b and the stator core 51. With the change in the main magnetic flux, voltages are induced respectively in the first and second coil sections LA and LB, thereby inducing electric currents respectively in the first and second coil sections LA and LB. Moreover, with the voltages induced respectively in the first and second coil sections LA and LB being of the same polarity, the electric currents induced respectively in the first and second coil sections LA and LB are not cancelled by each other, thus increasing the total electric current induced in the field coil 80. Furthermore, the electric currents induced respectively in the first and second coil sections LA and LB are rectified by the diode 93 to flow in one direction, namely the rectification direction. Consequently, field current flows in the field coil 80 in the rectification direction, thereby exciting the field coil 80.

Next, a circuit module 100, which includes the above-described resonance circuits, will be described with reference to FIGS. 8-12.

The circuit module 100 includes the first capacitors 91, the second capacitor 92, the diode 93, an electronic-component holder 101, a first busbar 110, a second busbar 120 and a third busbar 130. The electronic-component holder 101 is formed of an electrically insulative material such as a synthetic resin.

Figure 9:
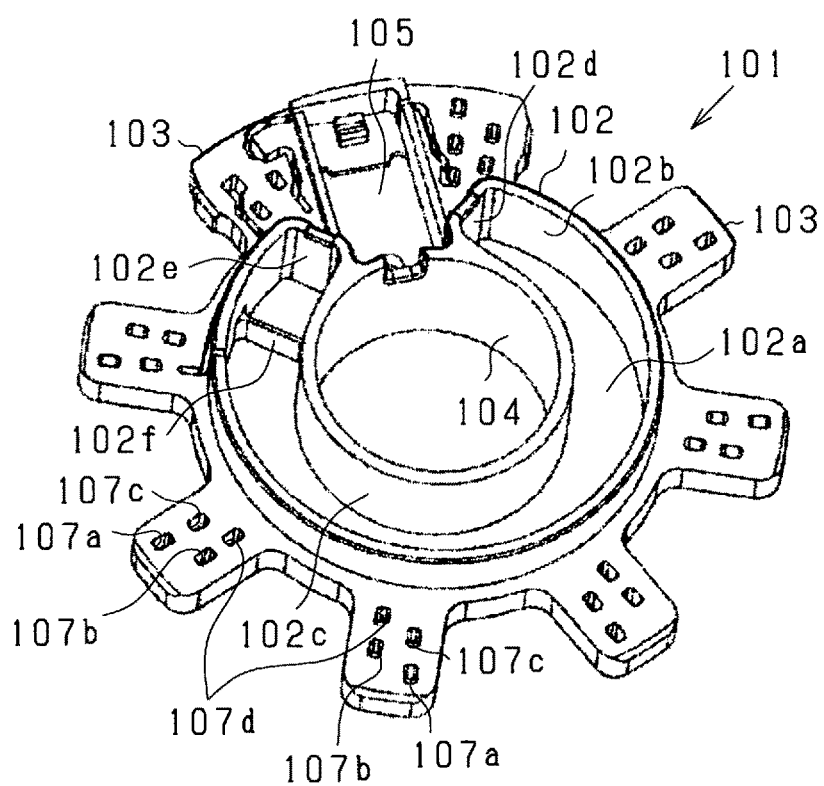
FIG. 9 is a perspective view of an electronic-component holder of the circuit module.

As shown in FIG. 9, the electronic-component holder 101 includes an annular main body 102. The main body 102 has a substantially C-shaped bottom wall 102a, a radially outer circumferential wall 102b that axially extends from a radially outer end portion of the bottom wall 102a, and a radially inner circumferential wall 102c that axially extends from a radially inner end portion of the bottom wall 102a. Moreover, the main body 102 also has a first side wall 102d that axially extends from one of opposite circumferential end portions of the bottom wall 102a, and a second side wall 102e that axially extends from the other of the opposite circumferential end portions of the bottom wall 102a. The height (or axial dimension) of each of the walls 102b, 102c, 102d and 102e is set to be larger than the height of the first capacitors 91 and the second capacitor 92. Consequently, it becomes possible to receive the first capacitors 91 and the second capacitor 92 in a receiving space defined by the walls 102a, 102b, 102c, 102d and 102e. More specifically, the receiving space is partitioned into first and second parts by a partition wall 102f that axially extends from the bottom wall 102a. The first capacitors 91 are received in the first part of the receiving space while the second capacitor 92 is received in the second part of the receiving space.

In the main body 102, there is formed a center hole 104 in which the rotating shaft 61 is inserted. More specifically, the center hole 104 is defined by a radially inner circumferential surface of the radially inner circumferential wall 102c.

The electronic-component holder 101 also includes a plurality of winding-fixing portions 103 that each extend radially outward from the main body 102 and are spaced at equal intervals in the circumferential direction. More specifically, in the present embodiment, the number of the winding-fixing portions 103 is set to be equal to the number of the main pole portions 72 (i.e., eight). Each of the winding-fixing portions 103 extends radially outward from an axially intermediate part of the radially outer circumferential wall 102b.

Moreover, the electronic-component holder 101 further includes a diode-mounting portion 105 to which the diode 93 is mounted. The diode-mounting portion 105 extends radially outward, in a circumferential range where no radially outer circumferential wall 102b is formed, from an axially intermediate part of the radially inner circumferential wall 102c. The diode 93 is mounted to a flat surface of the diode-mounting portion 105 by fixing means, more particularly by a bolt 106 (see FIG. 8) inserted in a through-hole 93a (see FIG. 10) of the diode 93.

In each of the winding-fixing portions 103, there is formed first to fourth insertion holes 107a-107d each of which penetrates the winding-fixing portion 103 in the axial direction. The insertion holes 107a-107d will be described in detail later.

Figure 10:
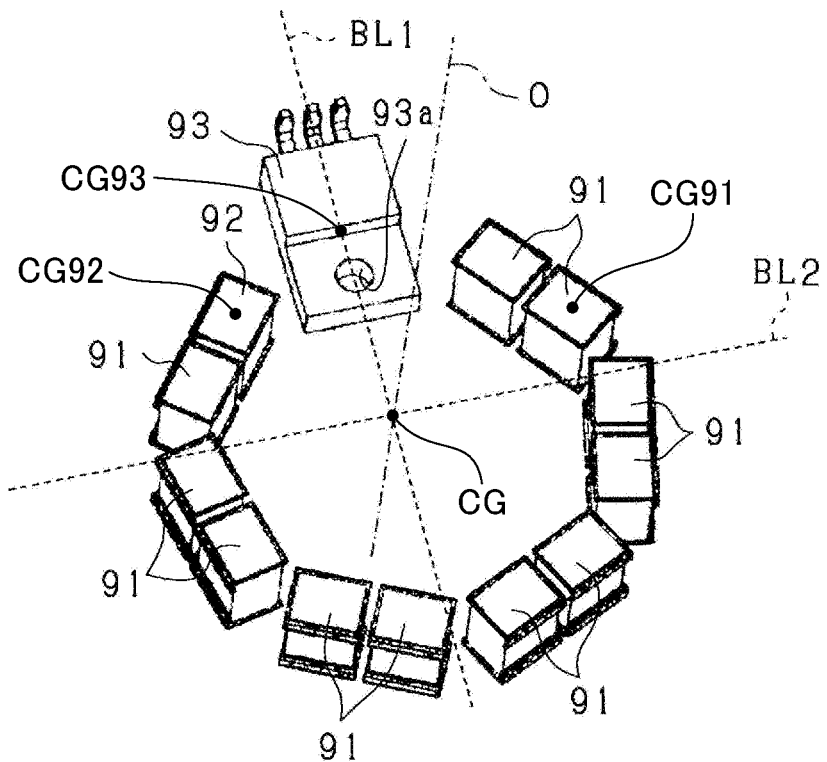
FIG. 10 is a schematic perspective view illustrating the arrangement of capacitors and a diode in the field coil type rotating electric machine.
Figure 11:
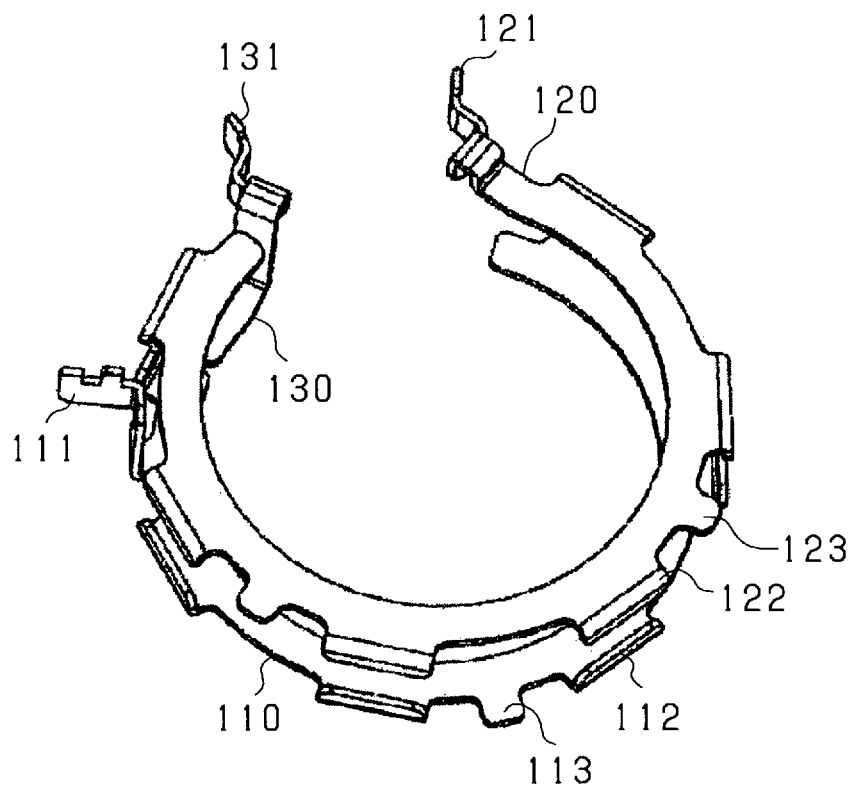
FIG. 11 is a perspective view of busbars included in the circuit module.
Figure 12:
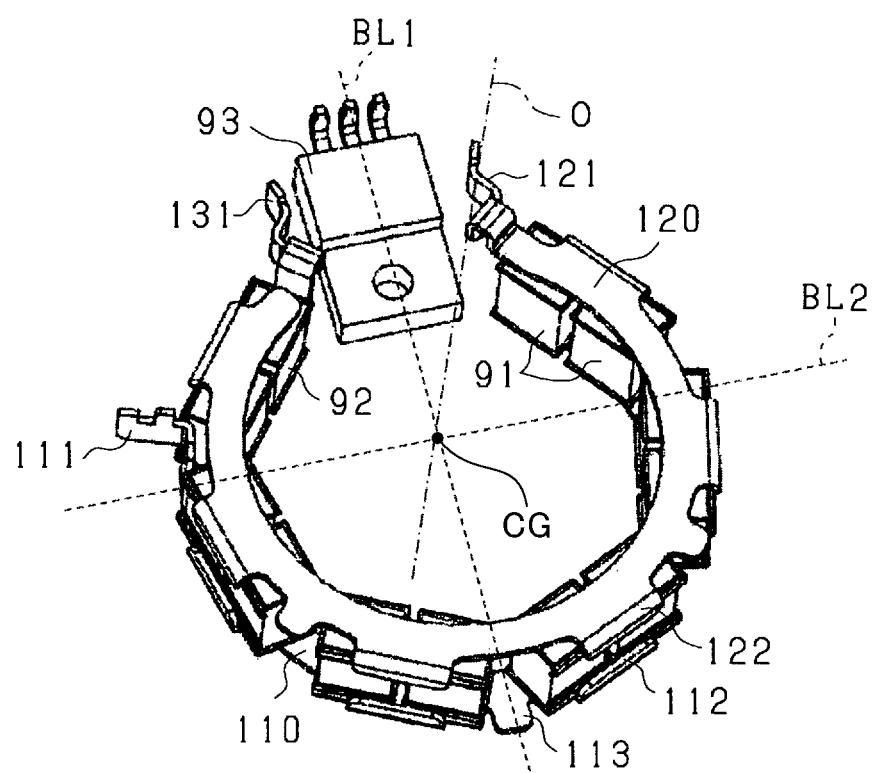
FIG. 12 is a schematic perspective view illustrating the arrangement of the capacitors, the diode and the busbars in the field coil type rotating electric machine.

As shown in FIGS. 10-12, when viewed along the central axis O of the rotating shaft 61, the eleven first capacitors 91 and the single second capacitor 92 are arranged in a substantially annular shape around the central axis O. Each of the first and second capacitors 91 and 92 has a substantially cuboid or cubic shape.

The first capacitors 91 have their respective first terminals electrically connected to the first busbar 110 that is arc-shaped (more specifically, substantially C-shaped). The first capacitors 91 and the second capacitor 92 have their respective second terminals electrically connected to the second busbar 120 that is also arc-shaped (more specifically, substantially C-shaped). The second capacitor 92 has its first terminal electrically connected to the third busbar 130 that is arc-shaped. The third busbar 130 is formed separately from the first busbar 110 and arranged apart from the first busbar 110. The first, second and third busbars 110, 120 and 130 are arranged in a substantially annular shape around the central axis O of the rotating shaft 61.

At a circumferential end of the first busbar 110, there is formed a first connection terminal 111 that is electrically connected to both the second end of the first coil section LA and the first end of the second coil section LB. At a circumferential end of the second busbar 120, there is formed a second connection terminal 121 that is electrically connected to both the second end of the second coil section LB and the anode of the diode 93. At a circumferential end of the third busbar 130, there is formed a third connection terminal 131 that is electrically connected to both the first end of the first coil section LA and the cathode of the diode 93.

Moreover, on a radially outer peripheral portion of the first busbar 110, there are formed a plurality (e.g., six) of first stoppers 112 at equal intervals in the circumferential direction. On a radially outer peripheral portion of the second busbar 120, there are formed a plurality (e.g., six) of second stoppers 122 at equal intervals in the circumferential direction. Each of the second stoppers 122 is located at the same circumferential position as and in axial alignment with a corresponding one of the first stoppers 112.

Each of the first and second stoppers 112 and 122 is provided to engage with one circumferentially-adjacent pair of the capacitors 91 and 92, thereby preventing displacement of the circumferentially-adjacent pair of the capacitors 91 and 92. This displacement prevention function of the first and second stoppers 112 and 122 contributes to reduction in vibration and noise generated with rotation of the rotor 60.

Furthermore, on the radially outer peripheral portion of the first busbar 110, there is formed a first protrusion 113 protruding radially outward. On the radially outer peripheral portion of the second busbar 120, there are formed two second protrusions 123 protruding radially outward. Each of the second protrusions 123 is circumferentially offset from the first protrusion 113 so as not to face the first protrusion 113 in the axial direction.

The radial distance (or width) from a radially outer end of the first protrusion 113 to a radially inner end of the first busbar 110 is slightly shorter than the radial distance (or width) from a radially inner surface of the radially outer circumferential wall 102b to a radially outer surface of the radially inner circumferential wall 102c. The radial distance (or width) from a radially outer end of each of the second protrusions 123 to a radially inner end of the second busbar 120 is slightly shorter than the radial distance (or width) from the radially inner surface of the radially outer circumferential wall 102b to the radially outer surface of the radially inner circumferential wall 102c. With the first and second protrusions 113 and 123, it is possible to prevent radial displacement of the first and second busbars 110 and 120. This displacement prevention function of the first and second protrusions 113 and 123 also contributes to reduction in vibration and noise generated with rotation of the rotor 60.

As shown in FIGS. 10 and 12, in the present embodiment, the first capacitors 91, the second capacitor 92, the diode 93 and the first, second and third busbars 110, 120 and 130 are arranged substantially symmetrically with respect to a first reference line BL1; the first reference line BL1 is defined to extend straight through the central axis O of the rotating shaft 61 and perpendicular to the central axis O. Moreover, the electronic-component holder 101 is shaped and arranged to be substantially symmetrical with respect to the first reference line BL1. In addition, in FIGS. 10 and 12, there is also shown a second reference line BL2 which is defined to extend straight through the central axis O of the rotating shaft 61 and perpendicular to both the central axis O and the first reference line BL1.

In the present embodiment, all the electronic components forming the resonance circuits, which include the first capacitors 91, the second capacitor 92, the diode 93 and the first, second and third busbars 110, 120 and 130, are arranged so that the overall center of gravity CG of all the electronic components is located closer than each of the centers of gravity of the electronic components to the central axis O of the rotating shaft 61. More particularly, in the present embodiment, all the electronic components forming the resonance circuits are arranged so that the overall center of gravity CG of all the electronic components is located on the central axis O of the rotating shaft 61.

the individual electronic components, only the center of gravity CG91 of one of the first capacitors 91, the center of gravity CG92 of the second capacitor 92 and the center of gravity CG93 of the diode 93 are shown in FIG. 10.

The overall center of gravity CG of all the electronic components may be determined as follows. Let X, Y and Z be the coordinates of the overall center of gravity CG on a three-dimensional coordinate system. Let Xi, Yi and Zi be the coordinates of the center of gravity of each individual electronic component, where i=1, 2, . . . , n and n is the number of all the electronic components. Then, the coordinates X, Y and Z of the overall center of gravity CG can be determined by the following equations:

$W = \Sigma Wi;$ $X = \Sigma(Xi \times Wi)/W;$ $Y = \Sigma(Yi \times Wi)/W;$ and $Z = \Sigma(Zi \times Wi)/W$ where W is the sum of weights of all the electronic components and Wi is the weight of each individual electronic component.

In addition, in FIGS. 10 and 12, the coordinate axes of the three-dimensional coordinate system may be respectively represented by the central axis O of the rotating shaft 61, the first reference line BL1 and the second reference line BL2; the origin of the three-dimensional coordinate system may be represented by the intersection point between the central axis O of the rotating shaft 61, the first reference line BL1 and the second reference line BL2. All the electronic components forming the resonance circuits may be arranged on the rotating shaft 61 so that the overall center of gravity CG of all the electronic components is located at the origin of the three-dimensional coordinate system.

Figure 13:
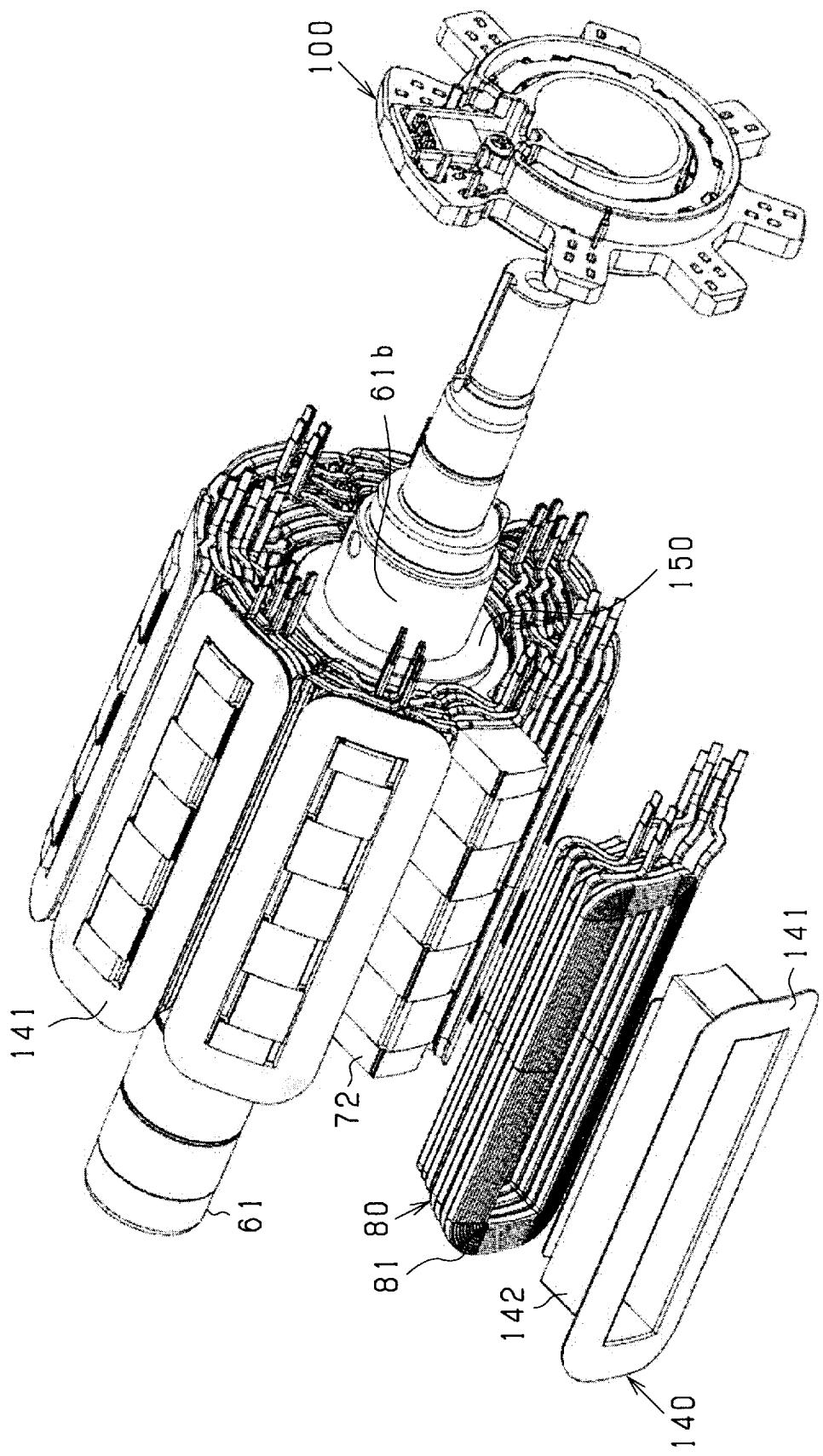
FIG. 13 is a perspective view showing a field coil, winding holders and the electronic-component holder of the field coil type rotating electric machine.
Figure 14:
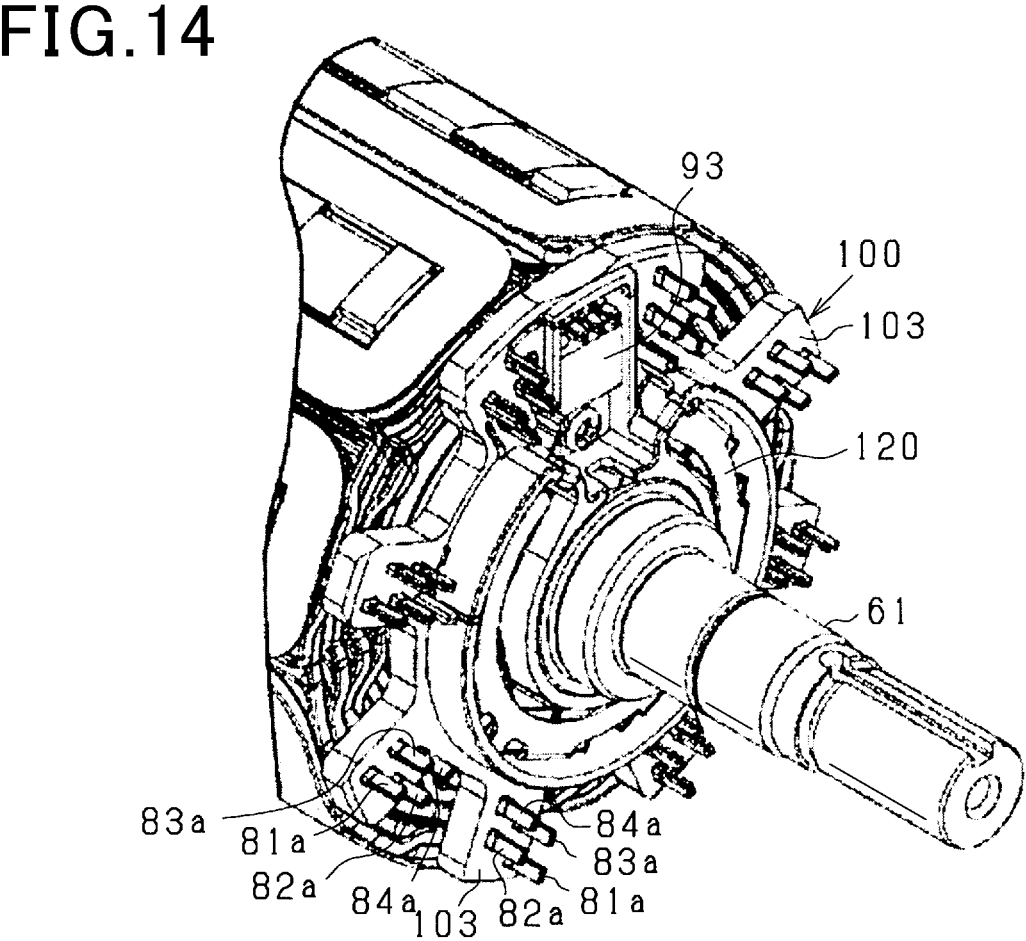
FIG. 14 is an enlarged perspective view of an end part of the rotor.

Next, a method of winding the field coil 80 on the main pole portions 72 of the rotor 60 and a method of mounting the electronic-component holder 101 to the rotating shaft 61 will be described with reference to FIGS. 13-15.

In the present embodiment, the rotating electric machine 40 includes the winding holders 140, which are formed of an electrically insulative material such as a synthetic resin. As shown in FIG. 13, each of the winding holders 140 has a flange portion 141 facing the stator 50 through a gap formed therebetween and a spindle portion 142 on which the corresponding windings 81-84 are wound. The spindle portion 142 has a center hole formed therein. The flange portion 141 is formed at a radially outer end of the spindle portion 142 around the center hole of the spindle portion 142. On an outer surface of the spindle portion 142, there are wound the corresponding first winding 81, the corresponding second winding 82, the corresponding third winding 83 and the corresponding fourth winding 84 in this order from the flange portion 141 side (i.e., from the radially outer side). Consequently, each of the winding holders 140 and the corresponding windings 81-84 together form a winding module in which: the corresponding windings 81-84 are wound on the spindle portion 142 of the winding holder 140; and the corresponding first winding 81 is covered by the flange portion 141 of the winding holder 140 from the radially outer side. Moreover, each of the winding holders 140 has a corresponding one of the main pole portions 72 of the rotor 60 fitted in the center hole of the spindle portion 142 thereof; consequently, the winding module is mounted to the corresponding main pole portion 72.

Figure 15:
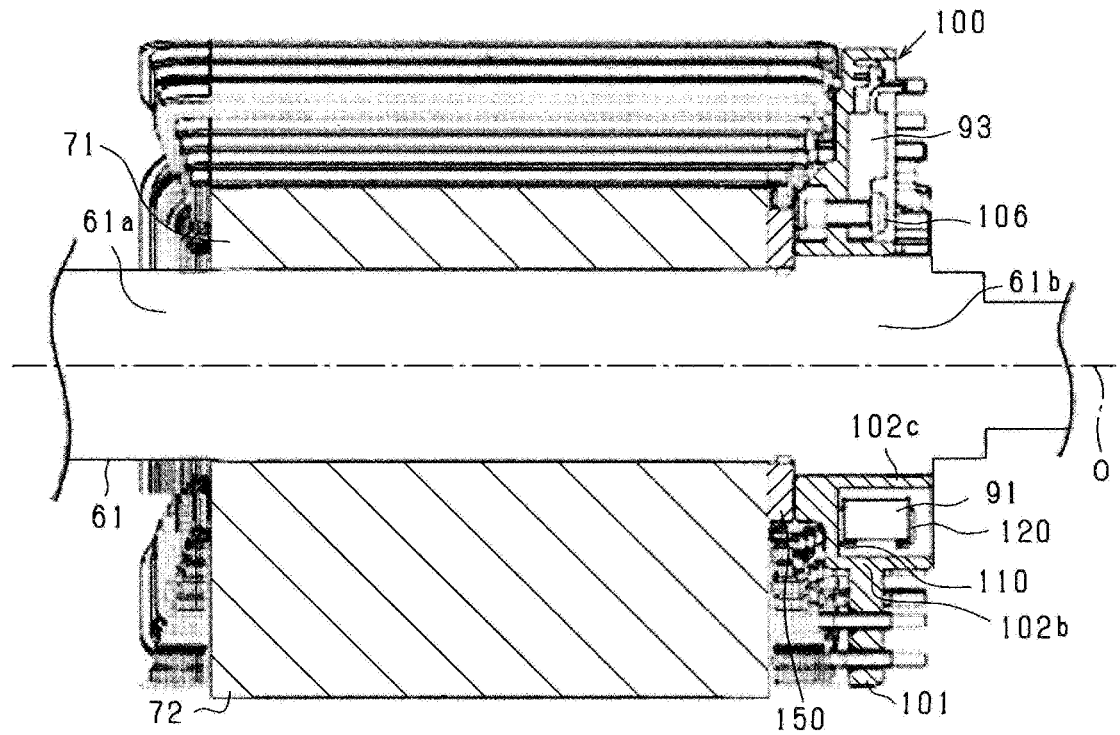
FIG. 15 is a longitudinal cross-sectional view of both the rotor and the electronic-component holder.

As shown in FIG. 15, the rotating electric machine 61 has a small-diameter portion 61a and a large-diameter portion 61b having a larger diameter than the small-diameter portion 61a. The small-diameter portion 61a is fixedly fitted in the center hole of the rotor core 71. The large-diameter portion 61b is axially adjacent to the small-diameter portion 61a and located outside the center hole of the rotor core 71. Moreover, on the small-diameter portion 61a, there is mounted an annular mounting member 150 (e.g., spacer) between the rotor 60 and the large-diameter portion 61b. Consequently, a radially inner part of a first axial end face of the mounting portion 150 abuts a shoulder formed between the smaller-diameter portion 61a and the large-diameter portion 61b; a second axial end face of the mounting portion 150 abuts an axial end face of the rotor 60.

The large-diameter portion 61b of the rotating shaft 61 is fixedly fitted in the center hole 104 of the electronic-component holder 101 of the circuit module 100. Thus, the inner surface of the center hole 104 of the electronic-component holder 101 abuts the large-diameter portion 61b of the rotating shaft 61; an axial end face of the electronic-component holder 101 abuts the first axial end face of the mounting portion 150. Consequently, the circuit module 100 is fixed to the rotating shaft 61 with the second busbar 120 exposed on the opposite axial side to the rotor 60. As a result, it becomes possible to improve the heat dissipation performance of the electronic components such as the second busbar 120.

On each of the main pole portions 72 of the rotor 60, a pair of end portions 81a of the corresponding first winding 81, a pair of end portions 82a of the corresponding second winding 82, a pair of end portions 83a of the corresponding third winding 83 and a pair of end portions 84a of the corresponding fourth winding 84 are led out to the circuit module 100 side in the axial direction. In the present embodiment, the end portions 81a of the corresponding first winding 81, the end portions 82a of the corresponding second winding 82, the end portions 83a of the corresponding third winding 83 and the end portions 84a of the corresponding fourth winding 84 are arranged in this order from the radially outer side to the radially inner side.

In each of the winding-fixing portions 103 of the electronic-component holder 101 of the circuit module 100, the first insertion hole 107a, the second insertion hole 107b, the third insertion hole 107c and the fourth insertion hole 107d are arranged in this order from the radially outer side to the radially inner side. Moreover, the first insertion hole 107a and the third insertion hole 107c are formed at the same circumferential position; the second insertion hole 107b and the fourth insertion hole 107d are formed at the same circumferential position offset from the circumferential position at which the first insertion hole 107a and the third insertion hole 107c are formed.

For each circumferentially-adjacent pair of the main pole portions 72 of the rotor 60, a pair of the end portions 81a of the first windings 81 wound respectively on the main pole portions 72 of the circumferentially-adjacent pair are arranged to abut each other, together inserted in the first insertion hole 107a of a corresponding one of the winding-fixing portions 103 of the electronic-component holder 101, and welded and fixed in the first insertion hole 107a. A pair of the end portions 82a of the second windings 82 wound respectively on the main pole portions 72 of the circumferentially-adjacent pair are arranged to abut each other, together inserted in the second insertion hole 107b of the corresponding winding-fixing portion 103, and welded and fixed in the second insertion hole 107b. A pair of the end portions 83a of the third windings 83 wound respectively on the main pole portions 72 of the circumferentially-adjacent pair are arranged to abut each other, together inserted in the third insertion hole 107c of the corresponding winding-fixing portion 103, and welded and fixed in the third insertion hole 107c. A pair of the end portions 84a of the fourth windings 84 wound respectively on the main pole portions 72 of the circumferentially-adjacent pair are arranged to abut each other, together inserted in the fourth insertion hole 107d of the corresponding winding-fixing portion 103, and welded and fixed in the fourth insertion hole 107d.

According to the present embodiment, it is possible to achieve the following advantageous effects.

In the present embodiment, the field coil type rotating electric machine 40 includes the stator 50 including the stator coil 52, the field coil 80 including the serially-connected coil section pair consisting of the first and second coil sections LA and LB, the rotating shaft 61 having the central axis O, and the rotor 60 fixed on the rotating shaft 61 to rotate together with the rotating shaft 61. The rotor 60 includes the rotor core 71 and the main pole portions 72 spaced at predetermined intervals (more particularly, at equal intervals in the present embodiment) in the circumferential direction and each radially protruding from the rotor core 71. Each of the first and second coil sections LA and LB is wound on each of the main pole portions 72 of the rotor 60. The field coil type rotating electric machine 40 is configured to have the field current induced in the field coil 80 upon supply of the harmonic current to the stator coil 52. The field coil type rotating electric machine 40 further includes the diode 93 and the first capacitors 91 (i.e., the capacitor unit CC). The diode 93 has its cathode connected to the first coil section LA-side end of the serially-connected coil section pair (i.e., the first end of the first coil section LA) and its anode connected to the second coil section LB-side end of the serially-connected coil section pair (i.e., the second end of the second coil section LB). The first capacitors 91 are connected in parallel with the second coil section LB. In the field coil type rotating electric machine 40, there are formed both the series resonance circuit including the first coil section LA and the first capacitors 91 and the parallel resonance circuit including the second coil section LB and the first capacitors 91. All the electronic components electrically connected with the field coil 80, which include the first capacitors 91, the second capacitor 92, the diode 93 and the first, second and third busbars 110, 120 and 130, are arranged so that the overall center of gravity CG of all the electronic components is located closer than each of the centers of gravity of the electronic components to the central axis O of the rotating shaft 61. More particularly, in the present embodiment, all the electronic components are arranged so that the overall center of gravity CG thereof is located on the central axis O of the rotating shaft 61.

With the above arrangement, it becomes possible to reduce vibration and noise generated with rotation of the rotor 60, thereby improving the NV characteristics of the field coil type rotating electric machine 40.

Moreover, in the present embodiment, all the electronic components are arranged in the substantially annular shape around the central axis O of the rotating shaft 61. Furthermore, all the electronic components are arranged substantially symmetrically with respect to the first reference line BL1 that is defined to extend straight through the central axis O of the rotating shaft 61 and perpendicular to the central axis O.

With the above arrangement, it becomes possible to further improve the NV characteristics of the field coil type rotating electric machine 40.

In the present embodiment, all the electronic components are arranged on one axial side (i.e., on the circuit module 100 side) of the rotor 60.

With the above arrangement, it becomes possible to shorten the wiring for forming the resonance circuits, thereby reducing the loss in the wiring. Moreover, it also becomes possible to minimize imbalance around the central axis O of the rotating shaft 61.

In the present embodiment, the electronic components include the first, second and third busbars 110, 120 and 130 electrically connected with the first coil section LA, the second coil section LB, the diode 93 and the capacitors 91 and 92. When viewed along the central axis O of the rotating shaft 61, the first, second and third busbars 110, 120 and 130 are arranged in the substantially annular shape around the central axis O.

With the above arrangement, it becomes possible to locate the overall center of gravity CG of all the electronic components on the central axis O of the rotating shaft 61.

In the present embodiment, the first coil section LA is formed by serially connecting the eight first windings 81 wound respectively on the eight main pole portions 72 of the rotor 60. The second coil section LB is formed by serially connecting the eight second windings 82 that are wound respectively on the eight main pole portions 72 and serially connected with each other, the eight third windings 83 that are wound respectively on the eight main pole portions 72 and serially connected with each other, and the eight fourth windings 84 that are wound respectively on the eight main pole portions 72 and serially connected with each other. That is, each of the first and second coil sections LA and LB is wound on each of the main pole portions 72 of the rotor 60. Moreover, all of the end portions of the first coil section LA (i.e., the end portions 81*a* of the first windings 81) and the end portions of the second coil section LB (i.e., the end portions 82*a* of the second windings 82, the end portions 83*a* of the third windings 83 and the end portions 84*a* of the fourth windings 84) are led out to the one axial side (i.e., to the circuit module 100 side) of the rotor 60 where all the electronic components are arranged.

With the above arrangement, it becomes possible to locate the end portions of the first and second coil sections LA and LB close to the electronic components forming the resonance circuits, thereby suppressing loss due to extra wiring between the field coil 80 and the resonance circuits. Moreover, it also becomes possible to more reliably minimize imbalance around the central axis O of the rotating shaft 61.

In the present embodiment, on each of the main pole portions 72 of the rotor 60, there is wound one of the first windings 81, one of the second windings 82, one of the third windings 83 and one of the fourth windings 84 in this order from the radially outer side. That is, on each of the main pole portions 72 of the rotor 60, the first coil section LA is located radially outside the second coil section LB. Accordingly, among the end portions of the first and second coil sections LA and LB (i.e., the end portions 81*a* of the first windings 81, the end portions 82*a* of the second windings 82, the end portions 83*a* of the third windings 83 and the end portions 84*a* of the fourth windings 84), the end portions 81*a* of the first windings 81 are located radially outermost. Moreover, all the electronic components are arranged in a space radially inside the end portions 81*a* of the first windings 81.

With the above arrangement, it becomes possible to have all the electronic components received in the vacant space on the circuit module 100 side of the rotor 60, thereby making it possible to minimize the size of the field coil type rotating electric machine 40.

In the present embodiment, for each circumferentially-adjacent pair of the main pole portions 72 of the rotor 60, a pair of the end portions 81*a* of the first windings 81 wound respectively on the main pole portions 72 of the circumferentially-adjacent pair are together inserted in the first insertion hole 107*a* of a corresponding one of the winding-fixing portions 103 of the electronic-component holder 101. A pair of the end portions 82*a* of the second windings 82 wound respectively on the main pole portions 72 of the circumferentially-adjacent pair are together inserted in the second insertion hole 107*b* of the corresponding winding-fixing portion 103. A pair of the end portions 83*a* of the third windings 83 wound respectively on the main pole portions 72 of the circumferentially-adjacent pair are together inserted in the third insertion hole 107*c* of the corresponding winding-fixing portion 103. A pair of the end portions 84*a* of the fourth windings 84 wound respectively on the main pole portions 72 of the circumferentially-adjacent pair are together inserted in the fourth insertion hole 107*d* of the corresponding winding-fixing portion 103.

With the above configuration, it becomes possible to easily and reliably join the pairs of the end portions 81*a*-84*a* of the first to the fourth windings 81-84 by welding.

Moreover, each of the end portions 81*a*-84*a* of the first to the fourth windings 81-84 is fixed to the corresponding winding-fixing portion 103 of the electronic-component holder 101.

With the above configuration, it becomes possible to suppress radially-outward deformation of the end portions 81*a*-84*a* of the first to the fourth windings 81-84 due to the centrifugal force during rotation of the rotor 60. Consequently, it becomes possible to reduce stresses acting on the welds formed between the pairs of the end portions 81*a*-84*a* of the first to the fourth windings 81-84.

In the present embodiment, the field coil type rotating electric machine 40 includes the electronic-component holder 101 for holding the electronic components. The electronic-component holder 101 includes the main body 102 and the winding-fixing portions 103. The main body 102 is fixed to the circuit module 100-side axial end of the rotor 60 and has all the electronic components held thereon. The winding-fixing portions 103 are formed to be spaced at the predetermined intervals in the circumferential direction and each extend radially outward from the main body 102.

With the above configuration, it becomes possible to easily and reliably hold the electronic components by the electronic-component holder 101 in the field coil type rotating electric machine 40. Moreover, it also becomes possible to easily and reliably connect the end portions 81a-84a of the first to the fourth windings 81-84, which are fixed to the corresponding winding-fixing portions 103 of the electronic-component holder 101, with the electronic components held on the main body 102 of the electronic-component holder 101.

In the present embodiment, in each of the winding-fixing portions 103 of the electronic-component holder 101, the first insertion hole 107a and the second insertion hole 107b, which are radially adjacent to each other, are offset from each other in the circumferential direction. The second insertion hole 107b and the third insertion hole 107c, which are radially adjacent to each other, are offset from each other in the circumferential direction. The third insertion hole 107c and the fourth insertion hole 107d, which are radially adjacent to each other, are offset from each other in the circumferential direction.

With the above configuration, it becomes possible to reliably weld each corresponding pair of the end portions 81a-84a of the first to the fourth windings 81-84 without intervening with another corresponding pair of the end portions 81a-84a of the first to the fourth windings 81-84. For example, the pair of the end portions 81a of the first windings 81 inserted in the first insertion hole 107a is prevented from being accidently welded to the pair of the end portions 82a of the second windings 82. Consequently, it becomes possible to improve the efficiency of the welding process.

[Modification of First Embodiment]

Figure 16:
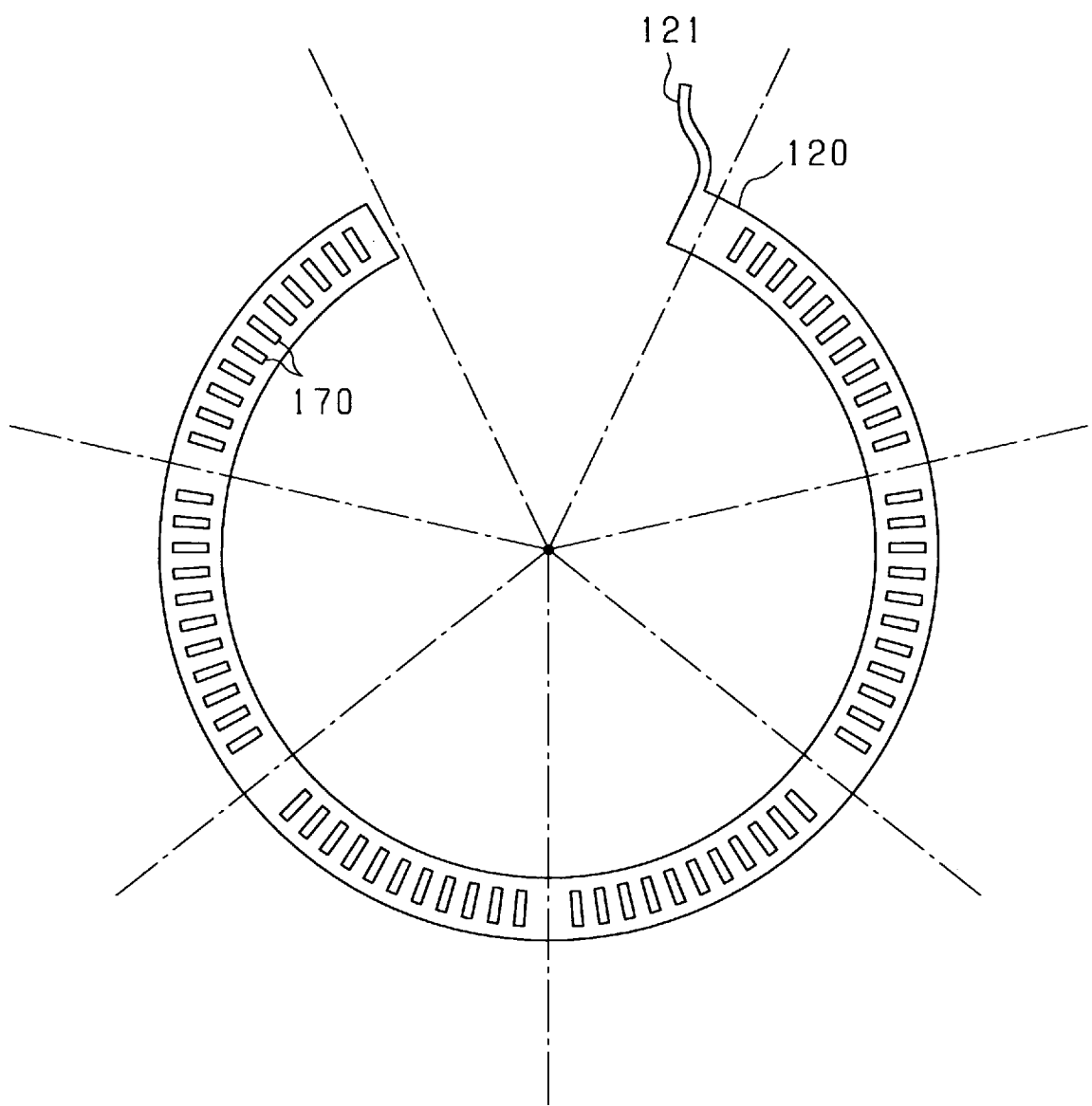
FIG. 16 is a plan view of a second busbar according to a modification of the first embodiment.

In this modification, as shown in FIG. 16, on a flat surface (i.e., a major surface exposed on the opposite axial side to the rotor 60) of the second busbar 120, there are formed a plurality of heat dissipation fins 170 to protrude in the axial direction. Consequently, with the heat dissipation fins 170, it becomes possible to improve the heat dissipation performance of the second busbar 120, thereby suppressing increase in the temperatures of the capacitors 91 and 92, the diode 93 and the busbars 110, 120 and 130.

In addition, in FIG. 16, the entire angular range of 360° is divided into seven sub-angular ranges which are demarcated by one-dot chain lines. It should be noted that for the sake of simplicity, the second stoppers 122 and the second protrusions 123 (see FIG. 11) are not shown in FIG. 16.

In this modification, the heat dissipation fins 170 are formed in six groups each being located within one sub-angular rage to dissipate heat generated by one circumferentially-adjacent pair of the capacitors 91 and 92. Consequently, it becomes possible to more effectively dissipate heat generated by the capacitors 91 and 92.

Second Embodiment

In the first embodiment, the capacitor unit CC is constituted of the plurality of first capacitors 91 that are connected in parallel with each other. Moreover, the second coil section LB is formed by serially connecting the eight serially-connected second windings 82, the eight serially-connected third windings 83 and the eight serially-connected fourth windings 84 (see FIG. 5).

Figure 17:
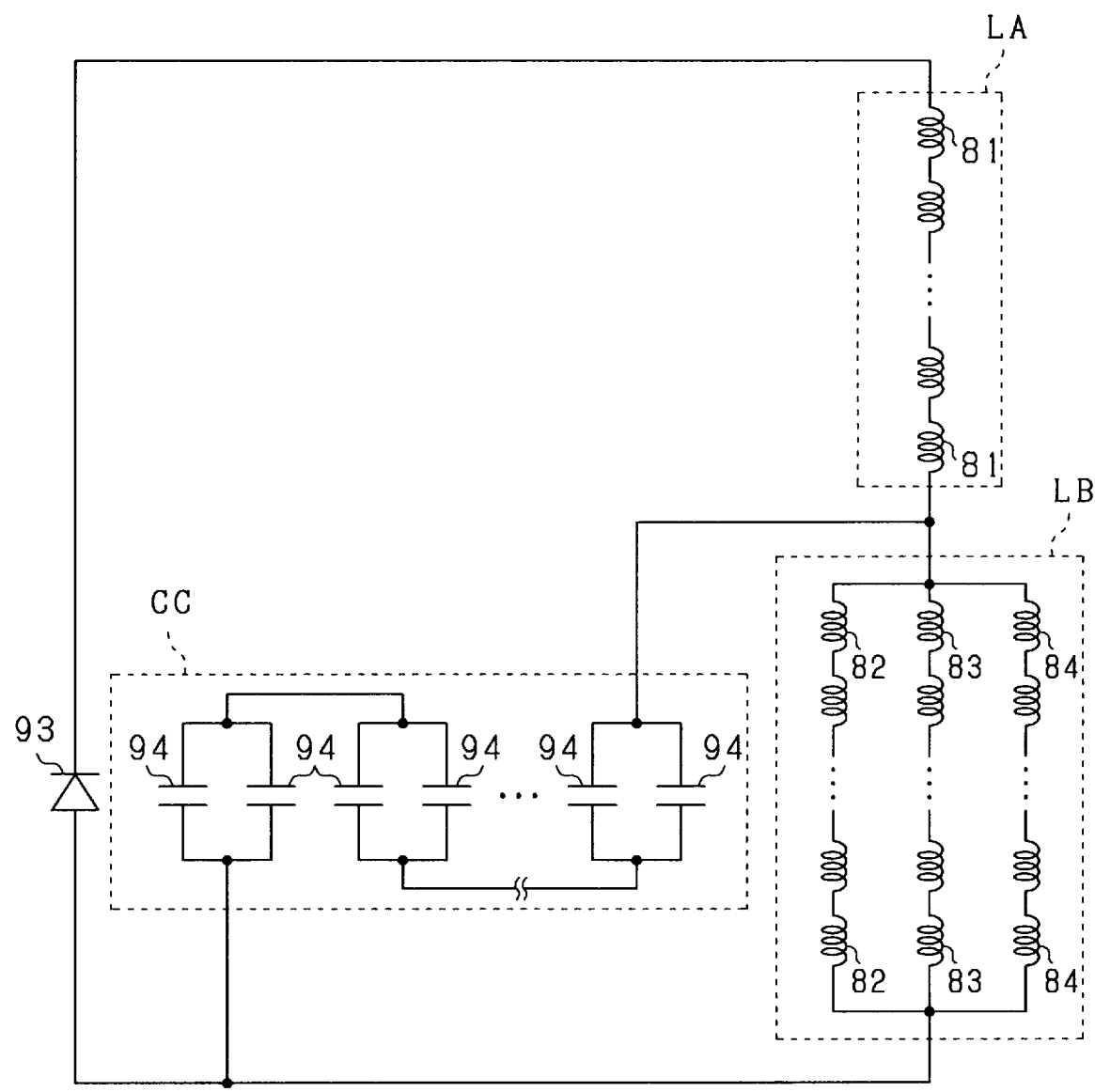
FIG. 17 is a configuration diagram of resonance circuits formed in a field coil type rotating electric machine according to a second embodiment.

In contrast, in the present embodiment, as shown in FIG. 17, the capacitor unit CC is constituted of six capacitor pairs that are connected in series with each other; each capacitor pair consists of two capacitors 94 connected in parallel with each other. That is, in the present embodiment, the capacitor unit CC is constituted of twelve capacitors 94. Moreover, the second coil section LB is formed by parallel connecting the eight serially-connected second windings 82, the eight serially-connected third windings 83 and the eight serially-connected fourth windings 84. In addition, in the case of the numbers of turns of the windings 81-84 being set to be equal, the resultant inductance of the second coil section LB is lower than the resultant inductance of the first coil section LA.

With the above configuration of the capacitor unit CC according to the present embodiment, it becomes possible to lower the voltage applied to each capacitor 94. Consequently, it becomes possible to lower the withstand voltage of each capacitor 94, thereby minimizing the size of each capacitor 94.

In addition, for the sake of continence, in the example shown in FIG. 17, no noise-suppression capacitor corresponding to the second capacitor 92 described in the first embodiment is employed.

Next, the connection between the capacitors 94 and busbars according to the present embodiment will be described with reference to FIGS. 18 and 19.

Figure 18:
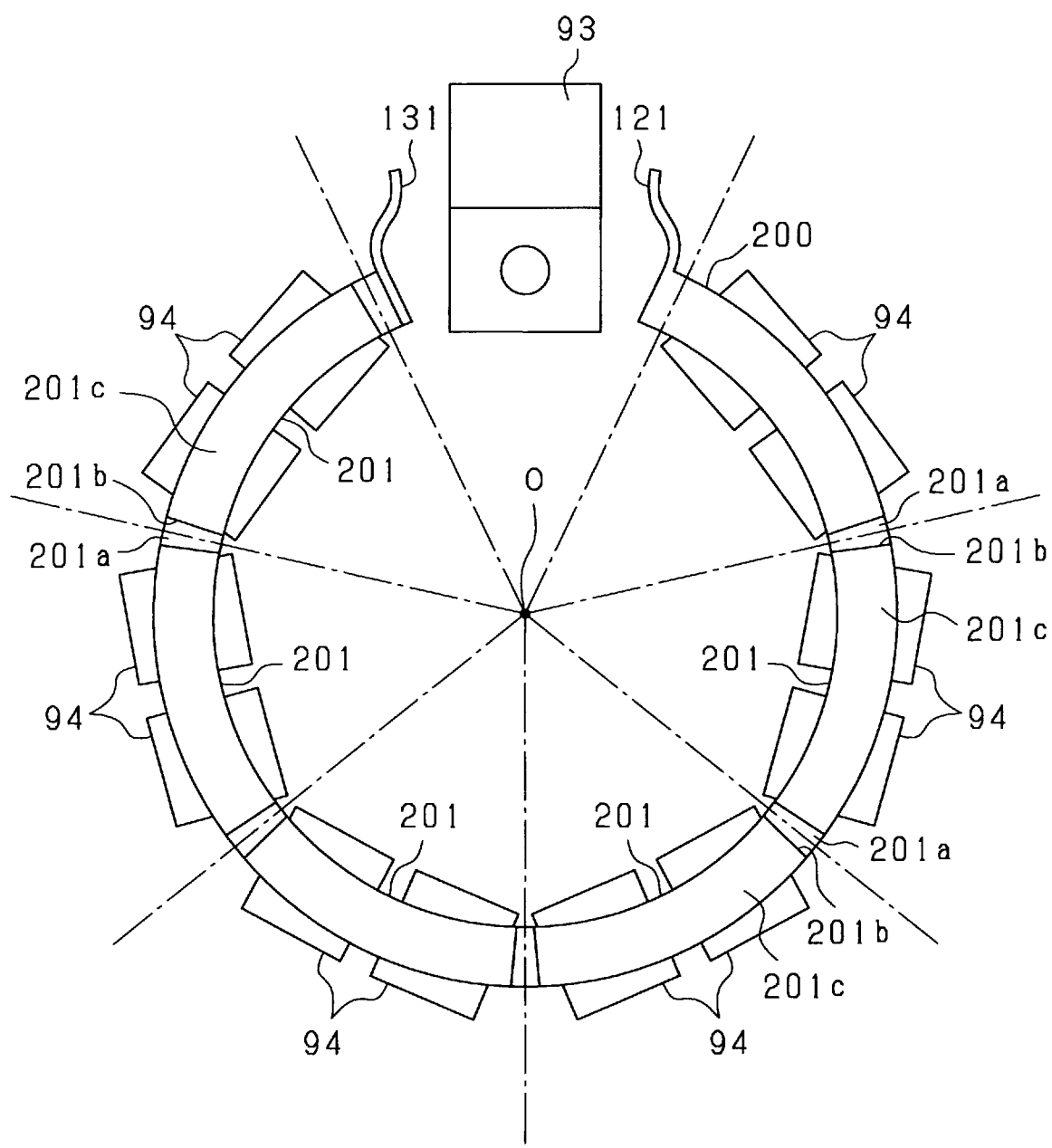
FIG. 18 is a plan view illustrating the configuration of busbars of the field coil type rotating electric machine according to the second embodiment.

FIG. 18 is a plan view, along the central axis O of the rotating shaft 61, of the electronic components forming the circuit module 100 according to the present embodiment. FIG. 19 is a developed view, in the circumferential direction, of the capacitors 94 and busbars of the circuit module 100 according to the present embodiment.

As shown in FIGS. 18 and 19, in the present embodiment, the circuit module 100 includes a plurality of intermediate busbars 201 each of which electrically connects first terminals of the capacitors 94 of a first capacitor pair with second terminals of the capacitors 94 of a second capacitor pair that is arranged adjacent to the first capacitor pair. More specifically, each of the intermediate busbars 201 has a first connection portion 201a, a second connection portion 201b and a third connection portion 201c. The first connection portion 201a is electrically connected with the first terminals of the capacitors 94 of the first capacitor pair; the first connection portion 201a is arc-shaped to extend in the circumferential direction. The second connection portion 201b axially extends from a circumferential end of the first connection portion 201a. The third connection portion 201c extends, from an axial end of the second connection portion 201b on the opposite side to the first connection portion 201a, in the shape of an arc along the circumferential direction; the third connection portion 201c is electrically connected with the second terminals of the capacitors 94 of the second capacitor pair.

Moreover, in the present embodiment, the circuit module 100 also includes a first end busbar 200 and a second end busbar 202. The first end busbar 200 is electrically connected with second terminals of the capacitors 94 of that capacitor pair which is located at one circumferential end of the array of the capacitor pairs arranged in the circumferential direction. The first end busbar 200 is arc-shaped to extend in the circumferential direction and has a second connection terminal 121 connected therewith. On the other hand, the second end busbar 202 has a first connection portion 202a and a second connection portion 202b. The first connection portion 202a is arc-shaped to extend in the circumferential direction; the first connection portion 202a is electrically connected with first terminals of the capacitors 94 of that capacitor pair which is located at the other circumferential end of the array of the capacitor pairs arranged in the circumferential direction. The second connection portion 202b axially extends from a circumferential end of the first connection portion 202a and has a third connection terminal 131 connected therewith.

In the present embodiment, as shown in FIG. 18, the diode 93, the capacitors 94 and the busbars 200-202 are arranged in a substantially annular shape around the central axis O of the rotating shaft 61. Moreover, the diode 93, the capacitors 94 and the busbars 200-202 are arranged substantially symmetrically with respect to a first reference line BL1 (not shown in FIG. 18) that is defined to extend straight through the central axis O of the rotating shaft 61 and perpendicular to the central axis O.

According to the present embodiment, it is also possible to achieve the same advantageous effects as achievable according to the first embodiment.

While the above particular embodiments and modifications have been shown and described, it will be understood by those skilled in the art that various further modifications, changes, and improvements may be made without departing from the spirit of the present disclosure.

(1) In the above-described embodiments, all of the electronic components forming the series and parallel resonance circuits and the diode are arranged on one axial side of the rotor 60.

As an alternative, all of the electronic components forming the series and parallel resonance circuits and the diode may be divided into two groups and the two groups may be arranged respectively on opposite axial sides of the rotor 60. In this case, arranging all of the electronic components forming the series and parallel resonance circuits and the diode in an annular shape around the central axis O of the rotating shaft 61, it is possible to improve the NV characteristics of the field coil type rotating electric machine 40.

(2) In the above-described embodiments, the first coil section LA is formed by serially connecting the first windings 81 wound respectively on the main pole portions 72 of the rotor 60.

As an alternative, the first coil section LA may be formed by parallel connecting the first windings 81 wound respectively on the main pole portions 72 of the rotor 60. In addition, the second coil section LB may be formed by serially connecting a plurality of windings wound respectively on the main pole portions 72 of the rotor 60.

(3) In the above-described embodiments, the rotating electric machine 40 is of an inner rotor type where the rotor 60 is arranged radially inside the stator 50.

As an alternative, the rotating electric machine 40 may be of an outer rotor type where a rotor is arranged radially outside a stator. In this case, the rotor may include a rotor core and main pole portions which each protrude radially inward from the rotor core and are spaced at predetermined intervals in the circumferential direction.

(4) In the above-described embodiments, the field coil 80 is formed of aluminum wires. Alternatively, the field coil 80 may be formed of other materials, such as copper wires or CNTs (Carbon Nanotubes).

Moreover, in the above-described embodiments, the field coil 80 is formed by compression shaping. Alternatively, the field coil 80 may be formed without compression shaping.

(5) In the above-described embodiments, the first, second and third busbars 110, 120 and 130 are arranged in the substantially annular shape around the central axis O.

As an alternative, the first, second and third busbars 110, 120 and 130 may be arranged in a substantially arc shape around the central axis O of the rotating shaft 61.

(6) In the above-described embodiments, the capacitor unit CC is constituted of the plurality of capacitors 91 or 94. As an alternative, the capacitor unit CC may be constituted of a single capacitor.

What is claimed is:

1. A field coil type rotating electric machine comprising:
a stator including a stator coil;
a field coil including a serially-connected coil section pair consisting of first and second coil sections;
a rotating shaft having a central axis;
a rotor fixed on the rotating shaft to rotate together with the rotating shaft, the rotor including a rotor core and a plurality of main pole portions spaced at predetermined intervals in a circumferential direction and each radially protruding from the rotor core; and
electronic components electrically connected with the field coil,
wherein
each of the first and second coil sections is wound on each of the main pole portions of the rotor,
the field coil type rotating electric machine is configured to have field current induced in the field coil upon supply of harmonic current to the stator coil,
the electronic components include a diode and at least one capacitor,
the diode has its cathode connected to a first coil section-side end of the serially-connected coil section pair and its anode connected to a second coil section-side end of the serially-connected coil section pair,
the at least one capacitor is connected in parallel with the second coil section,
in the field coil type rotating electric machine, there are formed both a series resonance circuit including the first coil section and the at least one capacitor and a parallel resonance circuit including the second coil section and the at least one capacitor, and
the electronic components are arranged so that an overall center of gravity of all the electronic components is located closer than each of centers of gravity of the electronic components to the central axis of the rotating shaft.

2. The field coil type rotating electric machine as set forth in claim 1, wherein when viewed along the central axis of the rotating shaft, all the electronic components are arranged in a substantially annular shape around the central axis.

3. The field coil type rotating electric machine as set forth in claim 2, wherein all the electronic components are arranged on one axial side of the rotor.

4. The field coil type rotating electric machine as set forth in claim 3, wherein all the electronic components are arranged substantially symmetrically with respect to a reference line that is defined to extend straight through the central axis of the rotating shaft and perpendicular to the central axis.

5. The field coil type rotating electric machine as set forth in claim 3, wherein the at least one capacitor comprises a plurality of capacitors,
the electronic components further include busbars electrically connected with the first coil section, the second coil section, the diode and the capacitors, and when viewed along the central axis of the rotating shaft, the busbars are arranged in a substantially annular or arc shape around the central axis.

6. The field coil type rotating electric machine as set forth in claim 5, wherein at least one of the busbars has heat dissipation fins formed therein.

7. The field coil type rotating electric machine as set forth in claim 3, wherein
each of the first coil section and the second coil section (1) is wound on each of the main pole portions of the rotor, and (2) has an end portion,
the end portion of the each of the first coil section and the second coil section is led out to one axial side of the rotor, and
all the electronic components are arranged at the one axial side of the rotor.

8. The field coil type rotating electric machine as set forth in claim 7, wherein:
on each of the main pole portions of the rotor, the first and second coil sections are wound so that one of the first and second coil sections is located radially outside the other of the first and second coil sections;
all the electronic components are arranged in a space radially inside some of the end portions of the first and second coil sections; and
the some of the end portions are located radially outermost among the end portions of the first and second coil sections.

9. The field coil type rotating electric machine as set forth in claim 8, wherein the first coil section includes a plurality of first windings that are wound respectively on the main pole portions of the rotor,
for each circumferentially-adjacent pair of the main pole portions of the rotor, a pair of the end portions of the first windings wound respectively on the main pole portions of the circumferentially-adjacent pair are connected with each other,
the second coil section includes a plurality of second windings that are wound respectively on the main pole portions of the rotor,
for each circumferentially-adjacent pair of the main pole portions of the rotor, a pair of the end portions of the second windings wound respectively on the main pole portions of the circumferentially-adjacent pair are connected with each other,
the field coil type rotating electric machine further comprises a plurality of winding-fixing portions that are located on the one axial side of the rotor
where all the electronic components are arranged and the plurality of winding-fixing portions are fixed to the rotor, and
each of the winding-fixing portions has both one connected-pair of the end portions of the first windings and one connected-pair of the end portions of the second windings fixed thereto.

10. The field coil type rotating electric machine as set forth in claim 9, further comprising an electronic-component holder for holding the electronic components,
wherein
the electronic-component holder includes a main body and the winding-fixing portions,
the main body is fixed to an axial end of the rotor on the one axial side of the rotor where all the electronic components are arranged, and has all the electronic components held thereon, and
the winding-fixing portions are formed to be spaced at predetermined intervals in the circumferential direction and each extend radially outward from the main body.

11. The field coil type rotating electric machine as set forth in claim 9, wherein each of the winding-fixing portions has both a first insertion hole and a second insertion hole formed therein,
in the first insertion hole, there are inserted the connected-pair of the end portions of the first windings in contact with each other, the connected-pair of the end portions of the first windings being welded together in the state of being inserted in the first insertion hole,
in the second insertion hole, there are inserted the connected-pair of the end portions of the second windings in contact with each other, the connected-pair of the end portions of the second windings being welded together in the state of being inserted in the second insertion hole, and
the first insertion hole and the second insertion hole are formed to be offset from each other in both a radial direction and the circumferential direction.

* * * * *